US012673862B2

(12) United States Patent
Moss et al.

(10) Patent No.: US 12,673,862 B2
(45) Date of Patent: Jul. 7, 2026

(54) APPARATUS AND METHODS FOR TRANSPORTING AND DISPENSING CARBONATED KEGGED BEVERAGES

(71) Applicants: Gandiva Moss, Berkeley, CA (US); Nicolas DiBenedetto, San Francisco, CA (US)

(72) Inventors: Gandiva Moss, Berkeley, CA (US); Nicolas DiBenedetto, San Francisco, CA (US)

( * ) Notice: Subject to any disclaimer, the term of this patent is extended or adjusted under 35 U.S.C. 154(b) by 104 days.

(21) Appl. No.: 18/882,740

(22) Filed: Sep. 11, 2024

(65) Prior Publication Data

US 2025/0083941 A1 Mar. 13, 2025

Related U.S. Application Data

(60) Provisional application No. 63/629,961, filed on Sep. 11, 2023.

(51) Int. Cl.
*B67D 1/08* (2006.01)
*B67D 1/00* (2006.01)

(52) U.S. Cl.
CPC ......... *B67D 1/0042* (2013.01); *B67D 1/0829* (2013.01); *B67D 2210/00133* (2013.01)

(58) Field of Classification Search
None
See application file for complete search history.

(56) References Cited

U.S. PATENT DOCUMENTS

| | | | | |
|---|---|---|---|---|
| 2,792,692 A * | 5/1957 | Bryan | B67D 1/0857 | 62/331 |
| 2,917,906 A * | 12/1959 | Woolley | B67D 1/0857 | 62/457.2 |
| 3,865,276 A * | 2/1975 | Thompson | B67D 1/0857 | 222/400.7 |
| 3,979,024 A * | 9/1976 | Hoppe | B67D 1/0857 | 137/574 |
| 4,225,059 A * | 9/1980 | Kappos | B67D 1/04 | 222/608 |

(Continued)

OTHER PUBLICATIONS

Kegco KC KT85D-L Keg Coupler D System description from Amazon.com, all pages.

(Continued)

*Primary Examiner* — Matthew W Jellett
(74) *Attorney, Agent, or Firm* — Jaquez Land Greenhaus & McFarland LLP; Bruce W. Greenhaus

(57) ABSTRACT

Selected features of a device for transporting and dispensing of chilled, carbonated beverages and its operation are described. A main body includes thermal insulation and is fitted with a multifunctional lid. The main body may be rotomolded. The lid provides a carbon dioxide canister coupled to a pressure regulator and a conduit from the regulator into the main body, with a quick-disconnect fitting to couple to a keg assembly inside the main body. The lid also provides a dispensing tower with a faucet and a beverage conduit with another quick-disconnect fitting for coupling to the keg assembly. The tower may be folded down to lie flat on the top of the lid, e.g., for ease of transportation. A drip tray grate and a drip tray reservoir may be set or fixed on the lid, to collect and dispose of beverage overflow.

18 Claims, 24 Drawing Sheets

(56) References Cited

U.S. PATENT DOCUMENTS 4,350,267 A * 9/1982 Nelson .................... B67D 1/04 222/398
6,648,177 B2 * 11/2003 Burger .................. B67D 7/845 222/626
6,783,034 B1 * 8/2004 Brent .................. B67D 1/0425 222/325
7,225,951 B2 * 6/2007 Wempe .................. A63B 55/40 222/529
D576,703 S * 9/2008 Nathan .......................... D32/15
7,716,783 B2 * 5/2010 DiPasquale ............ A47L 9/242 15/323
8,231,036 B2 * 7/2012 Campbell ............... B60R 9/065 224/42.32
D732,327 S * 6/2015 Ciuksza, Jr. ................... D7/300
9,156,671 B2 * 10/2015 Taylor .................. B67D 1/0857
9,389,010 B1 * 7/2016 Booker, Sr. ............ A01K 97/10
9,568,236 B1 * 2/2017 Laskowski ................ F25D 3/08
10,196,254 B2 2/2019 Kincaid et al.
10,301,165 B2 * 5/2019 Leyva .................. B67D 1/0872
2006/0011664 A1 * 1/2006 Hammond ........... B67D 1/0412 222/400.7
2010/0212351 A1 * 8/2010 Chapin ..................... F25D 3/08 222/131
2010/0326123 A1 * 12/2010 Johnson ................ F25D 31/006 62/457.9
2013/0214501 A1 * 8/2013 Vanderberg ............. B62B 1/208 280/30
2016/0214633 A1 * 7/2016 Kincaid ............. B65D 77/0493
2018/0057341 A1 * 3/2018 Kincaid ............. B65D 25/2852
2019/0173277 A1 * 6/2019 Kincaid ............. B65D 25/2852
2023/0101211 A1 * 3/2023 Hairrell .................. A61B 34/37

OTHER PUBLICATIONS

McMaster-CARR 5012K119 catalog description, https://www.mcmaster.com/5012K119/, all pages.

* cited by examiner

100

200

500

APPARATUS AND METHODS FOR TRANSPORTING AND DISPENSING CARBONATED KEGGED BEVERAGES

CROSS-REFERENCE TO RELATED APPLICATION

This application claims priority to U.S. Provisional Patent Application Ser. No. 63/629,961, entitled INSULATED TRANSPORT AND DISPENSER FOR CARBONATED KEGGED BEVERAGES, filed Sep. 11, 2023, which is hereby incorporated by reference in its entirety as if fully set forth herein, including Specification, Figures, Claims, and all other matter.

FIELD OF THE DISCLOSURE

This disclosure relates generally to the field of containers for beverage kegs, transport of beverage kegs, setup of beverage kegs for dispensing (serving/pouring), and dispensing of beverages from the beverage kegs, as well as associated operations. Selected apparatus and method embodiments described throughout this document and illustrated in the Figures relate to insulated containers for chilled carbonated beverage kegs, transport of chilled carbonated beverage kegs, setup of chilled carbonated beverage kegs for dispensing, and dispensing of carbonated beverages from such beverage kegs, as well as associated operations.

BACKGROUND

Kegs with chilled carbonated beverages often need to be transported to and operated at outdoor and other temporary venues, such as county fairs and various sports events. A commonly-used device for this task is what is sometimes referred to as a "Jockey Box." It typically contains a number of components and consumable items, including an ice chest (cooler), ice to cool the chest, one or more cooling coils, a carbon dioxide ($CO_2$) tank or canister to push the beverage out of the kegs for dispensing, a gas pressure regulator to control the pressure of the $CO_2$, beverage kegs that typically are placed outside of the cooler in ambient air (usually on the ground), beverage lines that travel to the kegs and the $CO_2$ regulator, a table to put the ice chest onto, and possibly extra coolers filled with ice to replace melted ice in the first cooler with the coils. The coils are connected to spigots on the front of the ice chest, and connected in the back of the ice chest to an adapter piece which connects through a hose to the kegged beverage, which is usually sitting on the ground or put into a tube surrounded with ice. Hoses also connect the keg to the pressure regulator and the pressure regulator to the $CO_2$ tank. In operation, after the connections are made, the ice chest is filled with ice and cold water until they cover the coils, thus creating an ice bath to chill the coils. The regulator pressure is adjusted appropriately for the style of beer and to compensate for the temperature of the keg. When the spigot in front of the ice chest is opened to pour the beverage, the pressure from the regulator forces the beverage out of the relatively warm keg to move through the chilled coils. When the beverage flows through the coils, a transfer of heat occurs so that the beverage in the coils becomes colder and the ice bath gains the heat shed from the flowing beverage. Thus, the beverage exiting from the spigot is colder than when it entered the coils due to the heat transfer inside the cooler. Over-foaming of the beverage usually occurs when there is a large enough temperature differential between the keg and the cooler. Over-foaming causes loss of the beverage flavor and slows the process of pouring additional cups.

Another problem with the Jockey Box is the set-up and breakdown time of the setup. Ice is important to the Jockey Box and generally needs to be obtained the day of the event to be at its coldest. This is usually a problem if the event is located at a fairground or another far-off area. The Jockey Box operator thus needs to procure the ice to fill the ice chest and a back-up ice cooler for when the ice melts in the first cooler (and possibly an ice bucket to set the keg into to collect the over-foam of the beverage). Once the ice is secured and distributed, the operator needs to set up a table, connect all the various components and begin testing and troubleshooting the beverage pours.

A further downside to the Jockey Box is the time delay inherent in the transportation of the keg from the brewery or distributor to the venue. During the transportation, the keg may sit outside the cooler and consequently the quality of the beverage may degrade. Recently, the India Pale Ale or IPA beer has emerged as a very popular beverage in the United States. This type of beer is also best stored and transported under refrigerated conditions. Moreover, it is preferable to avoid its exposure to large temperature variations. When a Jockey Box is used, the kegs usually sit (for example, in the back of a pickup truck) directly exposed to the large swings of daily temperatures. This exposure to high and low temperatures neutralizes the floral flavors and aromas from the hops in the beer. Thus, when the beer is ready to serve it is usually of lower quality than when it is served at a brewery, because of the exposure to (1) higher temperature and (2) temperature variations.

A need in the art thus exists to provide improved apparatus and methods for transporting and dispensing kegged beverages without the disadvantages of the Jockey Box described above.

SUMMARY

This document describes embodiments, variants, implementations, and examples effectuating novel techniques for addressing one or more of the needs identified above, and/or other needs. Selected embodiments described in this document include apparatus and methods for storing, transporting, and dispensing of carbonated and chilled kegged beverages.

In an embodiment, a beverage transport/dispenser includes a main body with round wall that has an outer shell and thermal insulation. There is an opening on top and an inner compartment sized for one or more beverage keg types. The transport/dispenser also includes a multifunctional lid formed to cover the opening. The lid has an outer surface and an inner surface with and a first opening (hole) and a second opening (hole) through it. The first and the second openings allow tubes to extend through the lid from the outer surface to the inner surface and into the inner compartment when the lid is mounted on the main body. The lid and the main body include a mechanism for attachment and fastening of the lid to the main body at the opening on top of the main body, thus covering the inner compartment and allowing opening and closing the lid on the main body. The transport/dispenser includes a quick-disconnect beverage tube fitting having a first beverage tube fitting component (plug/socket) and a second beverage tube fitting component (socket/plug). The transport/dispenser further includes a quick-disconnect gas tube fitting having a first gas tube fitting component (plug/socket) and a second gas tube fitting component (socket/plug). The lid also has a dispensing tower and a tower mount, the tower mount attaching the dispensing tower to the outer surface above the first opening and allowing the dispensing tower to be lowered to lie flat on the lid in a first position and to be raised to stand erect on the lid in a second position. The dispensing tower includes an upper end and a lower end that is nearer the tower mount than the upper end, a faucet at the upper end, and an upper beverage conduit with a first end coupled to the faucet and a second end extending through the first opening and attached to the first beverage tube fitting component. The lid additionally includes a gas canister retainer to hold a canister of compressed carbon dioxide ($CO_2$) on the outer surface, a pressure regulator with a gas input and a gas output, a regulator mount supporting the pressure regulator on the outer surface of the lid, and an upper gas conduit with a first end coupled to the gas output of the regulator and a second end extending through the second opening and attached to the first gas tube fitting component.

In aspects, the main body is rotomolded.

In aspects, the canister is mounted in the canister retainer and coupled to the gas input of the pressure regulator.

In aspects, the transport/dispenser includes: a keg containing a beverage, and a keg coupler with a beverage flow port and a gas input port, the keg coupler coupled to the keg; a lower beverage conduit having a first end coupled to the beverage flow port and a second end attached to the second beverage tube fitting component; and a lower gas conduit having a first end coupled to the gas input port and a second end attached to the second gas tube fitting component. The keg, the keg coupler, the lower beverage conduit, and the lower gas conduit are placed in the inner compartment. The first beverage tube fitting component and the second beverage tube fitting component are coupled together, and the first gas tube fitting component and the second gas tube fitting component are coupled together, so that when the $CO_2$ is allowed to flow from the canister, the beverage may be poured by opening the faucet.

In aspects, the first beverage tube fitting component includes a first plug and the second beverage tube fitting component includes a first socket, or vice versa;

In aspects, the first gas tube fitting component includes a second plug and the second gas tube fitting component includes a second socket, or vice versa.

In aspects, the lid also has a tower receptacle attached to the outer surface in location to receive the tower in the first position.

In aspects, the transport/dispenser also includes a drip tray reservoir on top of the outer surface and a drip tray grate on top of the drip tray reservoir, so that beverage overflow passes through the drip tray grate and is collected in the drip tray reservoir. The drip tray reservoir may be oriented in the lid by cutouts and corresponding vertical protrusions in the lid, and/or by magnetic catches.

In aspects, the transport/dispenser further includes a grip handle and a pair of wheels attached to the body, for handling it like a hand truck.

In aspects, the mechanism to attach the lid to the main body includes a rod in the main body allowing the lid to pivot and one or more latches to fasten the lid to the main body.

In aspects, the mechanism to attach the lid to the main body includes multiple latches.

In aspects, the lid also includes a faucet handle receptacle attached to the outer surface.

In aspects, the regulator is adjustable. The regulator may be set to a pressure between 6 and 25 psi. In more limited embodiments, the regulator may be set to a pressure between 12 and 17 psi.

Various features and aspects will be better understood with reference to the following description, drawings, and appended claims.

DETAILED DESCRIPTION

Figure 1A:
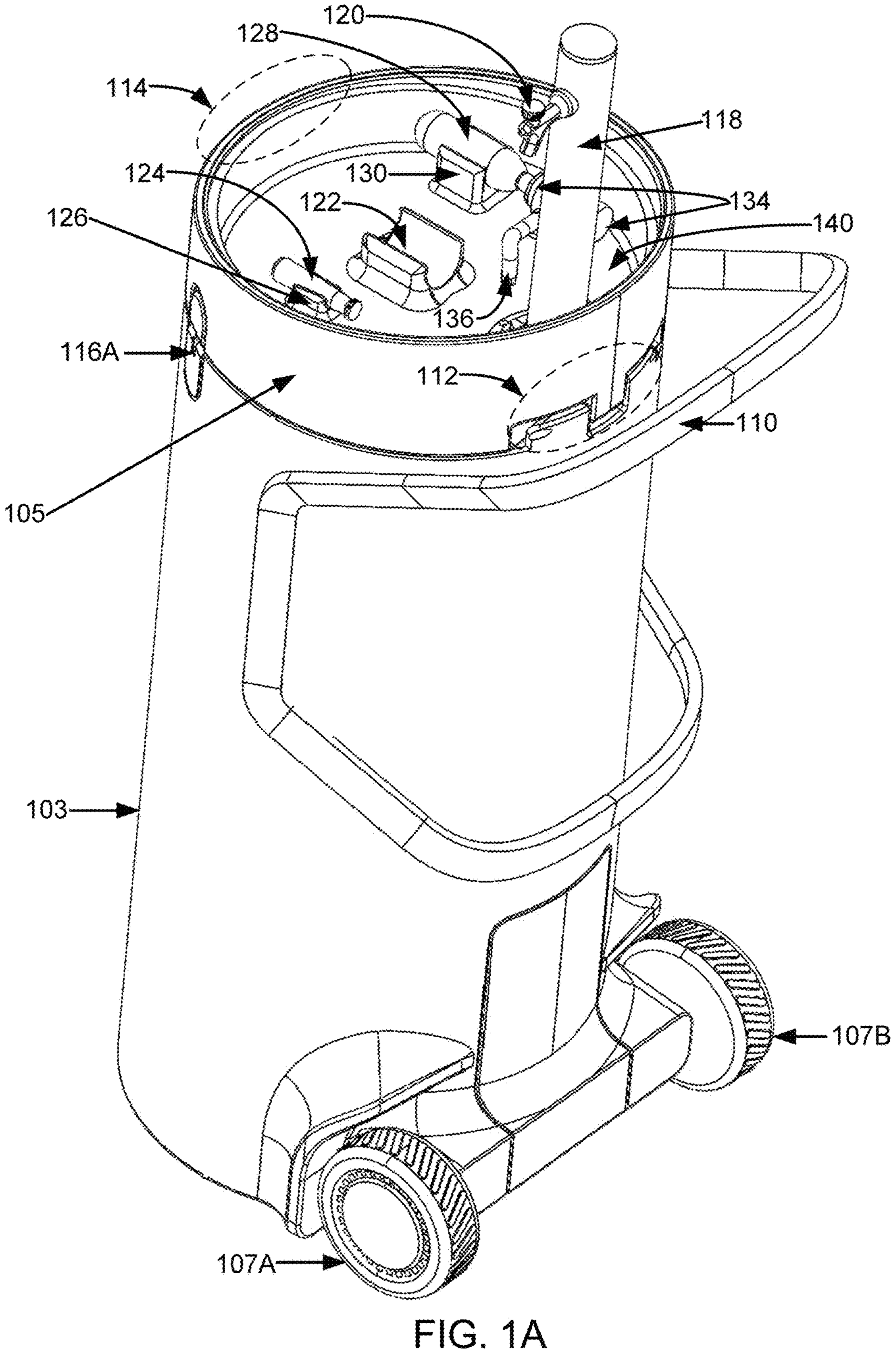
FIGS. 1A through 1F are perspective views illustrating selected features of a transport/dispenser for kegged beverages.
Figure 1B:
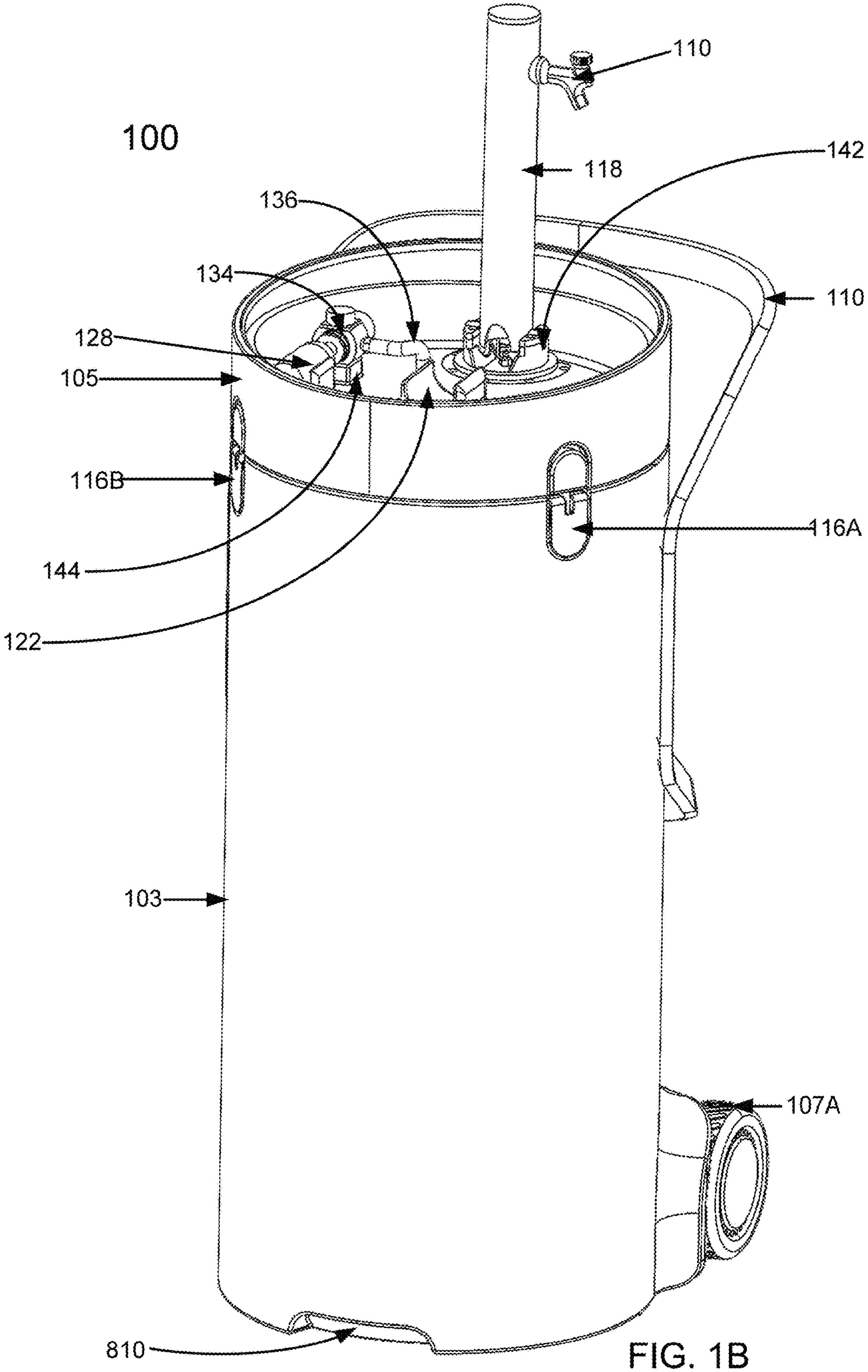
Figure 1C:
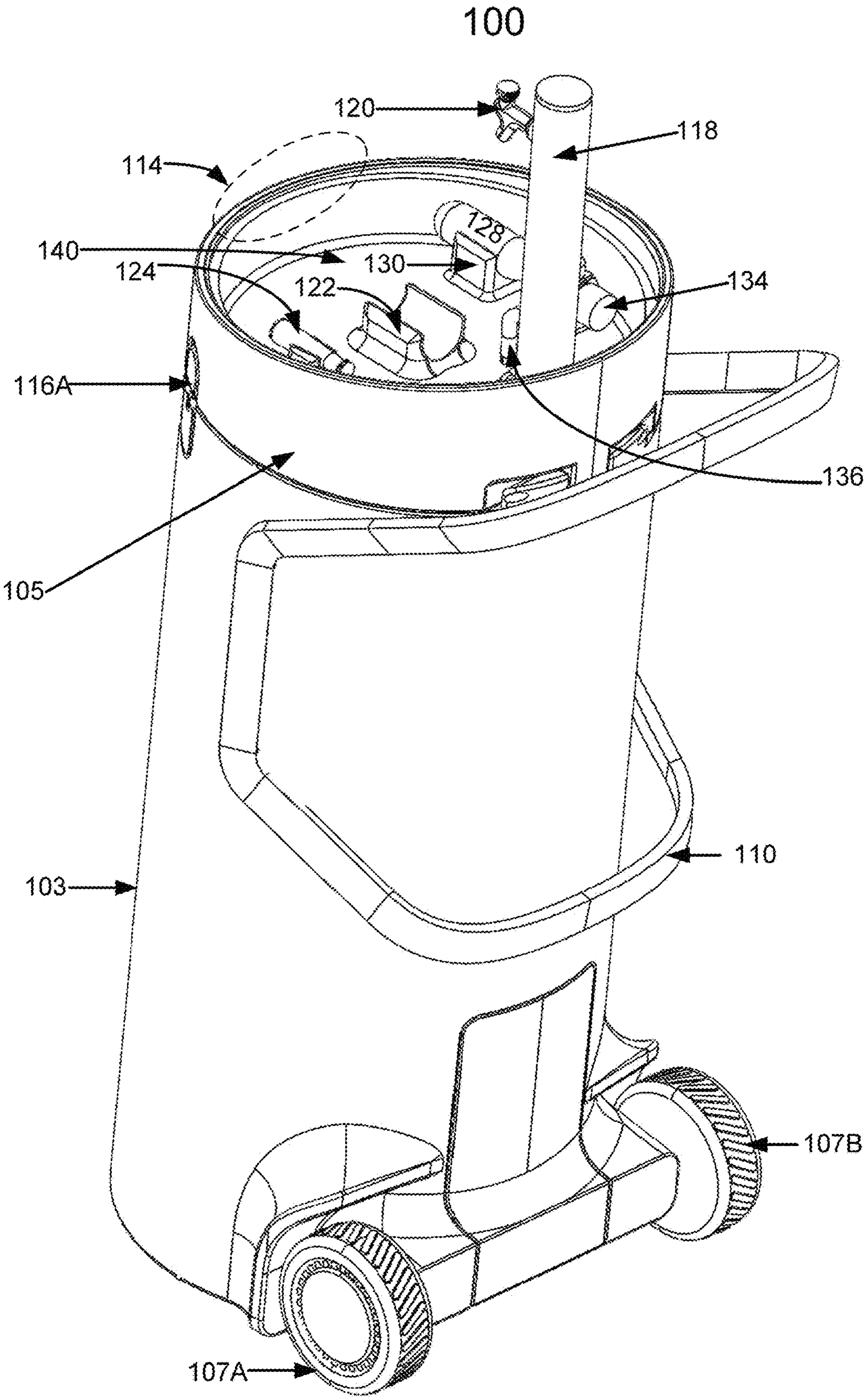
Figure 1D:
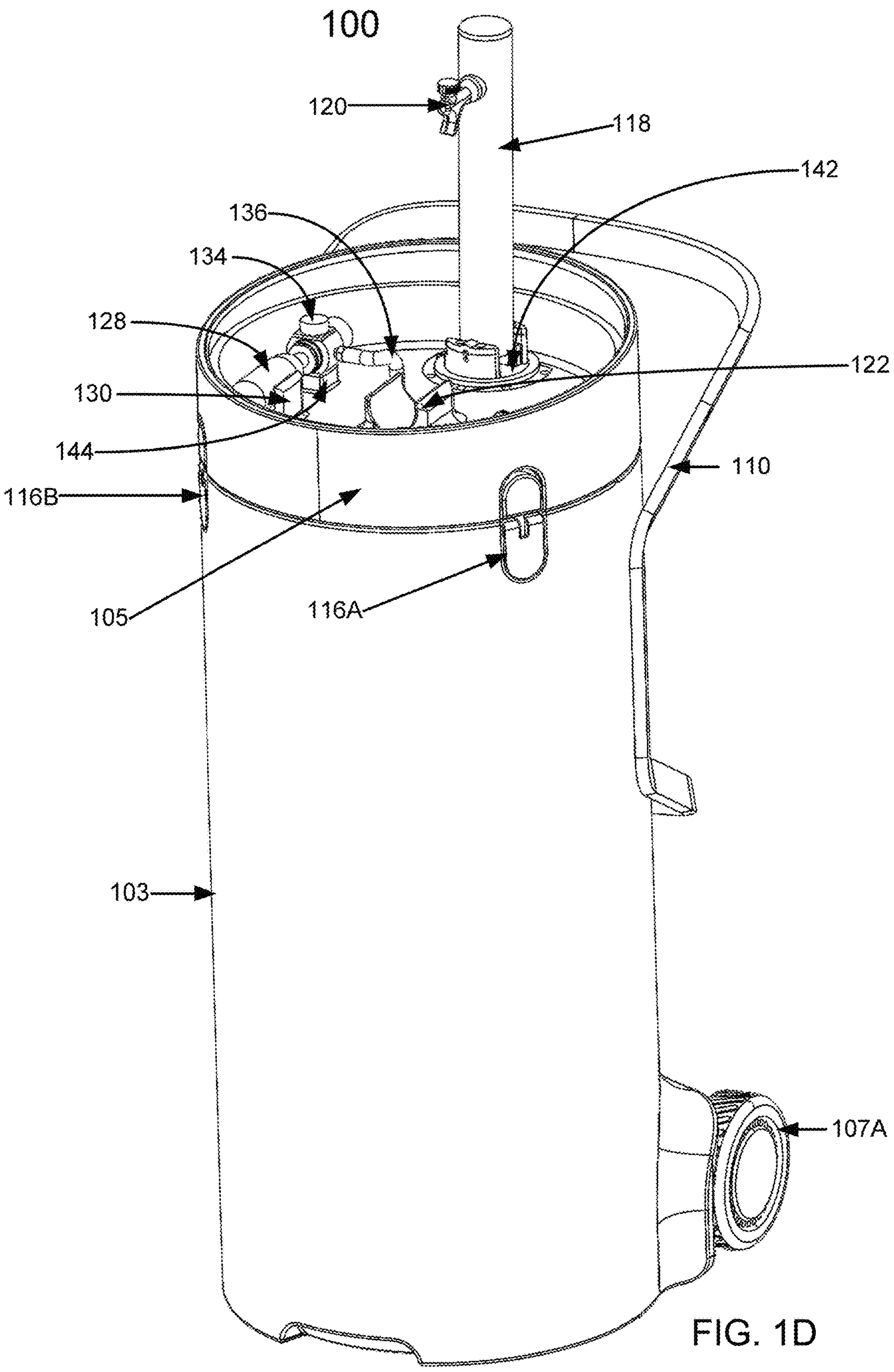
Figure 1E:
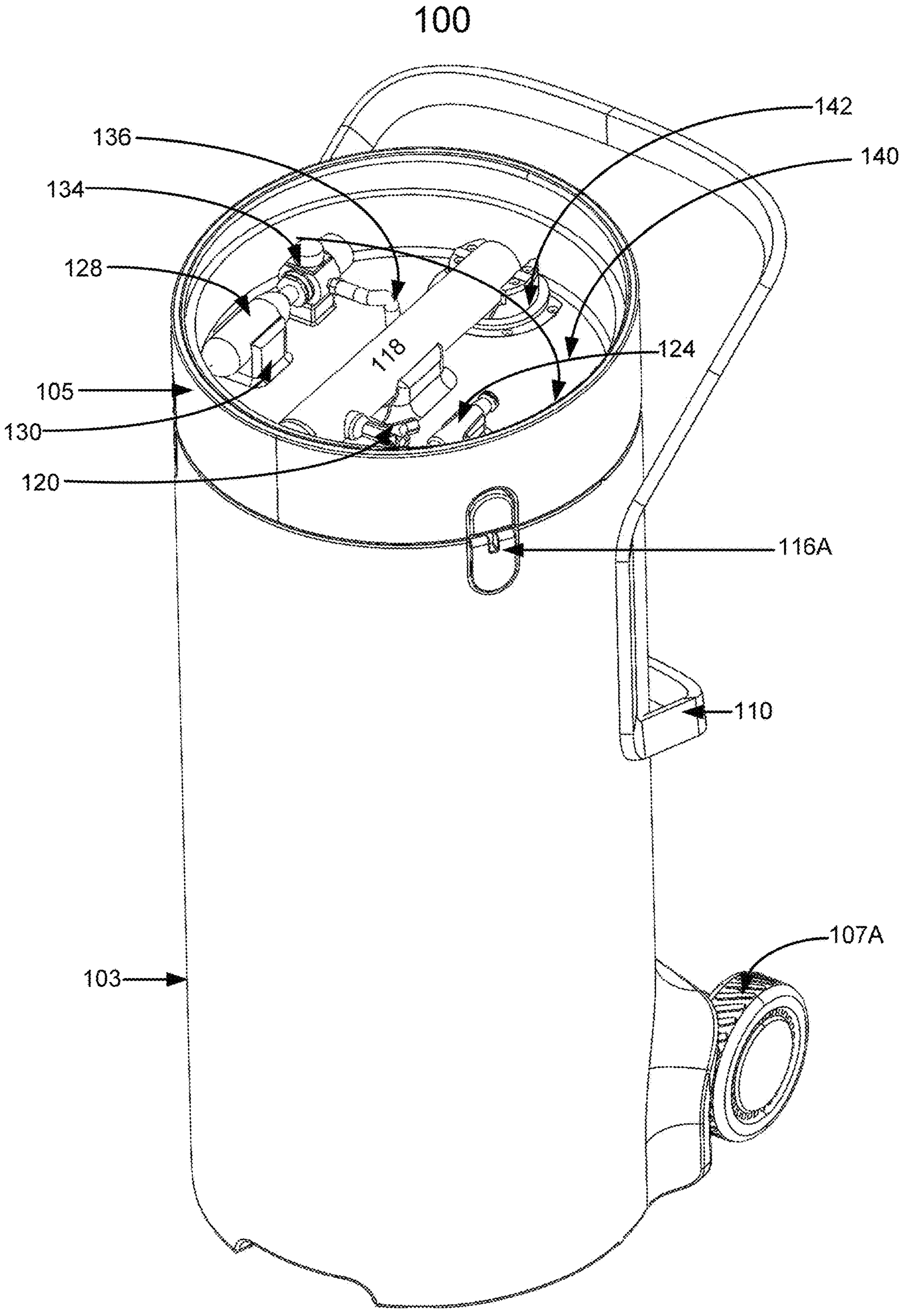
Figure 1F:
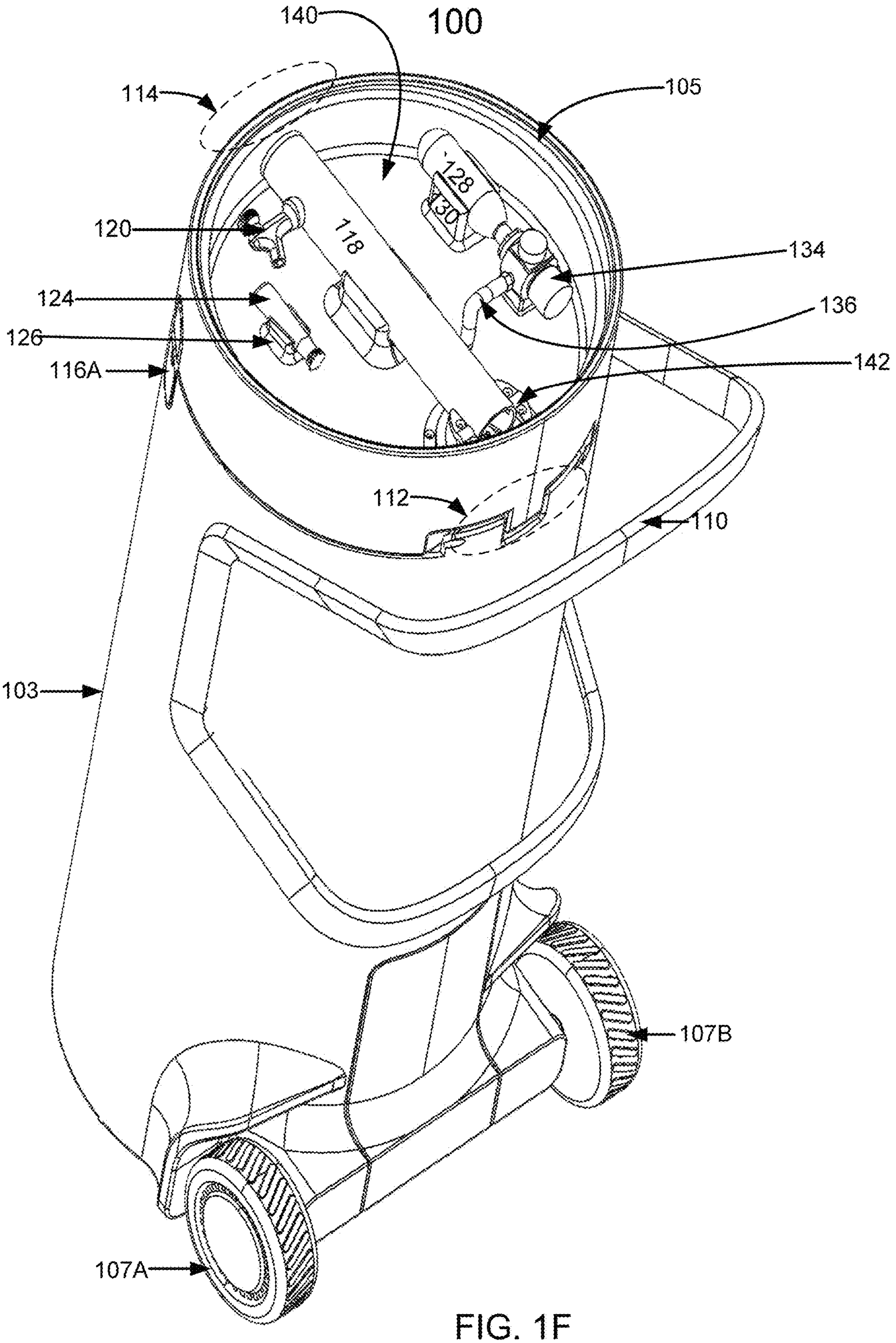

The words "embodiment," "variant," "example," "implementation," and similar words and expressions as used in this document refer to a particular apparatus, process, article of manufacture, or part of apparatus/process/article of manufacture, and not necessarily to the same apparatus, process, article of manufacture, or part thereof. Thus, "one embodiment" (or a similar word/expression) used in one place or context may refer to a particular apparatus, process, article of manufacture, or part thereof; the same or a similar expression in a different place or context may refer to a different apparatus, process, article of manufacture, or part thereof. The expression "alternative embodiment" and similar words and phrases are used to indicate one of a number of different possible embodiments, variants, examples, or implementations. The number of possible embodiments, variants, examples, or implementations is not necessarily limited to two or any other quantity. Characterization of an item as "exemplary" or listing an item following "for example," "for instance," or similar expressions means that the item is used for illustration. Such characterization does not necessarily mean that the embodiment, variant, example, implementation, or part thereof is a preferred one; the embodiment, variant, implementation, example, or part thereof may but need not be a currently-preferred embodiment, variant, implementation, example, or part thereof. All embodiments, variants, implementations, and examples are described for illustration purposes and are not necessarily strictly limiting.

In relation to hoses ("lines") and pipes, the words "couple," "connect," and similar words/phrases/expressions with their inflectional morphemes do not necessarily import an immediate or direct connection, but include within their meaning connections through mediate elements such as couplers and other hoses/lines/pipes, so that a liquid or gas may flow from one side of a connection to the other, possibly through the mediate elements if such mediate elements are present.

FIGS. 1A-1F are perspective views illustrating selected features of a transport/dispenser 100 for kegged beverages. The transport/dispenser 100 includes a main body 103, a lid 105, a pair of wheels 107A and 107B, and a grip handle 110. The wheels 107A/107B are disposed at the bottom of the body, and, together with the grip handle 110, facilitate movement and placement of the transport/dispenser 100; for example, a person may grab the handle 110 and pull on it so that the transport/dispenser 100 tips sideways on the wheels 107A/107B and can then be pushed or pulled and thereby rolled in the manner of hand truck operation. The main body 103 may be formed by rotational molding (rotomolded) from synthetic materials or plastic, with a hard outside shell, an internal space (inner compartment) for one or several types of beverage kegs, thermal insulation such as plastic foam along the inside walls, and space for a cooling medium (ice, ice packs, and/or other types of cold packs).

The main body 103 may also be formed by blow molding, thermoforming, injection molding, vacuum infusion, foam molding, gas assisted injection molding, slip casting, fused deposition modeling, fused filament fabrication, other types of fabrication, and by any combination of the above mentioned techniques.

The thermal insulation may be an integral part of the main body 103. The thermal insulation may be sufficient to keep the beverage in a previously-refrigerated keg suitably cold for retail dispensing and consumption over a period of one to several (e.g., three) days. Keeping the beverage in the refrigerated condition is typically facilitated by the cooling medium placed between the thermal insulation and the keg inside the main body of the transport/dispenser. Loose ice, ice packs, and other types of cold packs may be referred to as "cooling medium." The beverage in the keg may be refrigerated and/or the cooling medium provided, for example, by a commercial vendor for transportation to and distribution at various in- and outdoor venues such as sports games, picnics/outings, concerts, etc. In some embodiments, the outside shell is fabricated together with the walls; in other embodiments, the hard shell is added to the walls or vice versa. In some embodiments, the thermal insulation is added to (inserted into) the shell.

The lid 105 is attached to the body 103 with a rod (not shown) in the vicinity of portions 112 (inside the oval shown with dashed lines); the opposite side of the lid (portions 114, within the corresponding dashed oval) can be lifted, so that the lid 105 will rotate about the rod. In operation, e.g., beverage dispensing or moving of the transport/dispenser 100, latches 116A and 116B securely attach the lid 105 to the body 103. The rod and the latches 116A/116B thus form a three-point attachment of the lid 105 to the body 103. To insert a beverage keg into the body 103 or to remove the keg from the body 103, the lid may be unlatched and flipped open; in embodiments, the rod attaching the lid 105 may also be pulled out and the lid 105 may be lifted away from the body 103 to facilitate insertion/removal of the keg into the transport/dispenser 100 and cleaning inside the body 103.

As a person skilled in the art would understand after perusal of this document and the attached drawings, there may be a single latch or more than two latches, as well as other devices for securing the lid 105 to the body 103 in a manner that allows lifting of the lid 105.

The lid may include thermal insulation.

Reference numerals 118 and 120 designate, respectively, a dispensing tower and a faucet for dispensing the beverage. When dispensing the beverage, the beverage runs through a pipe or a hose/line inside the tower 118 and comes out of the faucet 120. (The pipe or hose/line is shown in a later FIG. 5A, designated with numeral 121.) Note that the tower 118 is mounted on a lid floor 140 by a mount 142; the mount 142 allows the tower 118 to be raised into an erect position for dispensing, and to be lowered by swiveling it ninety degrees into a tower receptacle 122. In FIGS. 1A through 1D, the tower 118 is erect, as it would be during dispensing, while in FIGS. 1E and IF, the tower 118 is lowered to lie substantially flat and held in place by the tower receptacle 122. A faucet handle 124 may be disconnected from the rest of the faucet 120 and stored in the faucet handle receptacle 126. Typically, the tower 118 would be folded down into the receptacle 122 and the faucet handle 124 would be put into its receptacle 126 when the transport/dispenser 100 is not used for dispensing, for example, during storage or transportation in a vehicle. The tower receptacle 122 and the faucet handle receptacle 126 may be mounted on the lid floor 140.

A CO2 canister 128 is set on and held in place by a CO2 retainer 130, which may be mounted on the lid floor 140. The CO2 gas in the canister 128 is fed into an input of a gas pressure regulator 134, which may be preset to a particular operating pressure at which the CO2 exits the regulator 134; the pressure regulator 134 may also be an adjustable pressure regulator, particularly if the transport/dispenser 100 is intended to operate with different beverages that benefit from being dispensed under different pressure settings. The pressure selector of the regulator 134 may be set to provide 6-25 psi at the output of the regulator, though settings outside of this range are not excluded; typically, however, the pressure would be set to between 12 and 17 psi. A regulator mount 144 may be interposed between the lid floor 140 and the regulator 134, to support the regulator 134.

From the regulator 134, the pressure-regulated CO2 goes into an upper gas conduit 136 (such as a pipe or hose/line) and into a keg inside the body 103; this is described in more detail throughout this document.

(Hose or line indicates flexibility relative to a pipe; a pipe may be metal or hard plastic, for example, while a hose/line may be made of rubber or softer, flexible plastic material. Of whatever material it is fabricated, the upper gas conduit 136 should be capable of carrying a gas, such as CO2.)

Figure 1G:
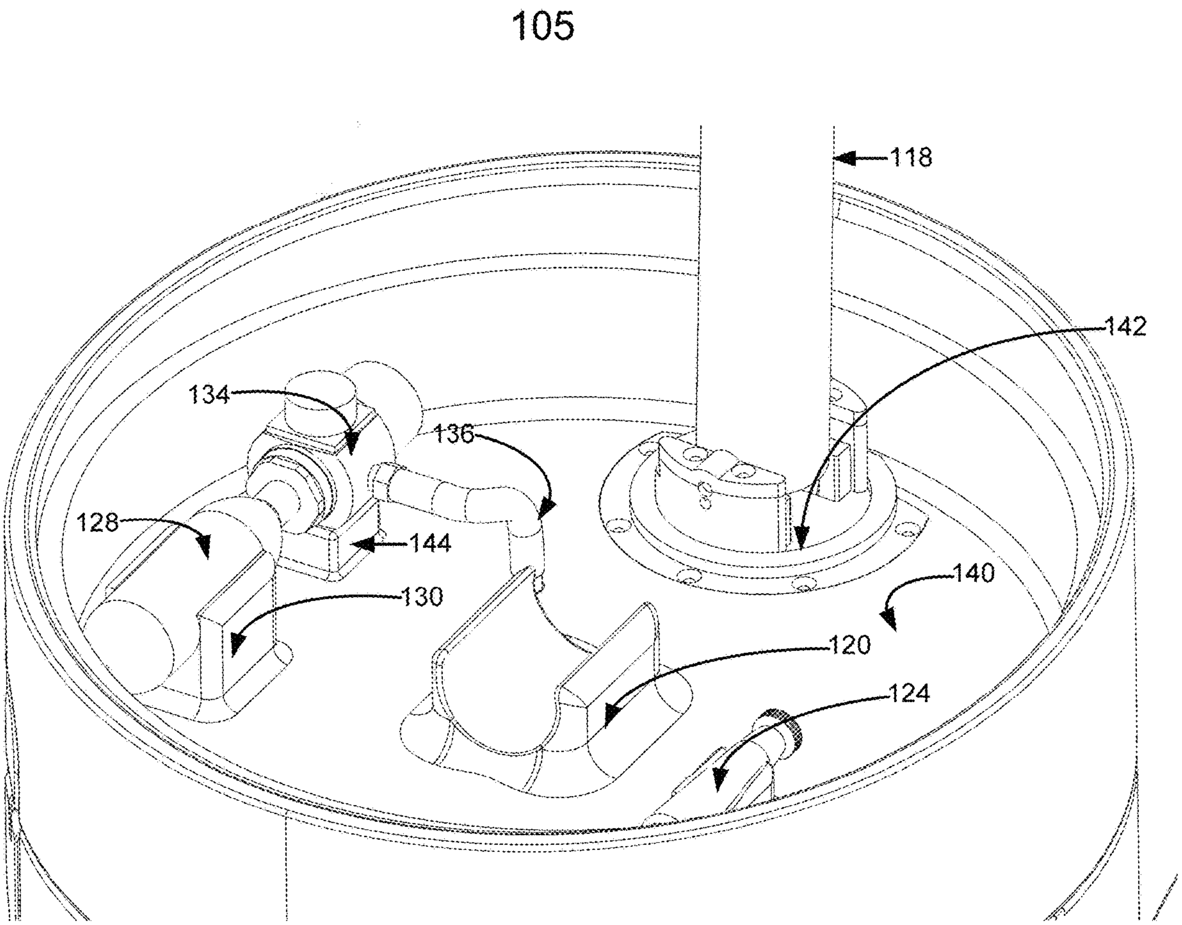
FIG. 1G is a perspective view illustrating in more detail selected features of a multifunctional lid of the transport/dispenser.

FIG. 1G is a perspective view showing in more detail the lid 105 installed on the transport/dispenser 100.

A transport/dispenser lid (such as the lid 105) in combination with a dispensing tower (such as the tower 118), a dispensing faucet (such as the faucet 120), a rotatable tower mount (such as the mount 142), a beverage conduit (such as the upper beverage conduit 121), a gas pressure regulator (such as the regulator 134), and a gas conduit into the main body (such as the upper gas conduit 136) may be referred to as a multifunctional lid. As described and shown in the Figures, a multifunctional lid may also include a pressurized gas canister with its retainer (such as the CO2 canister 128 and the canister retainer 130), a receptacle for the tower (such as the tower receptacle 122), a faucet handle receptacle (such as the faucet handle receptacle 126), one or more latches for fastening the multifunctional lid to the transport/dispenser, and other components.

Figure 1H:
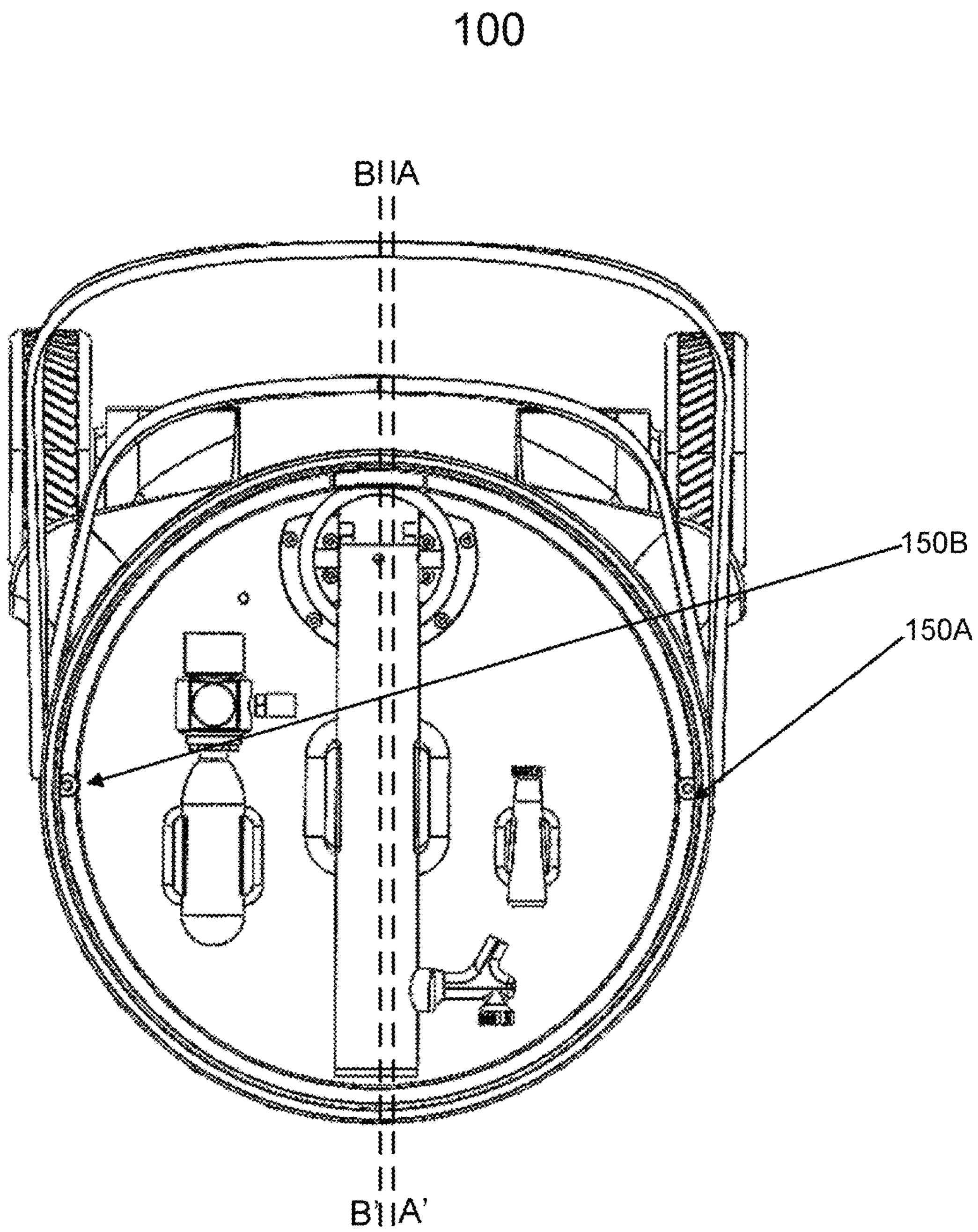
FIG. 1H is a top plan view of the transport/dispenser illustrating selected features of the multifunctional lid.

FIG. 1H is a top plan view of the transport/dispenser 100 showing the details of the lid 105. (Note that in this Figure, a drip tray grate and a drip tray reservoir discussed immediately below are not shown.)

Figure 2A:
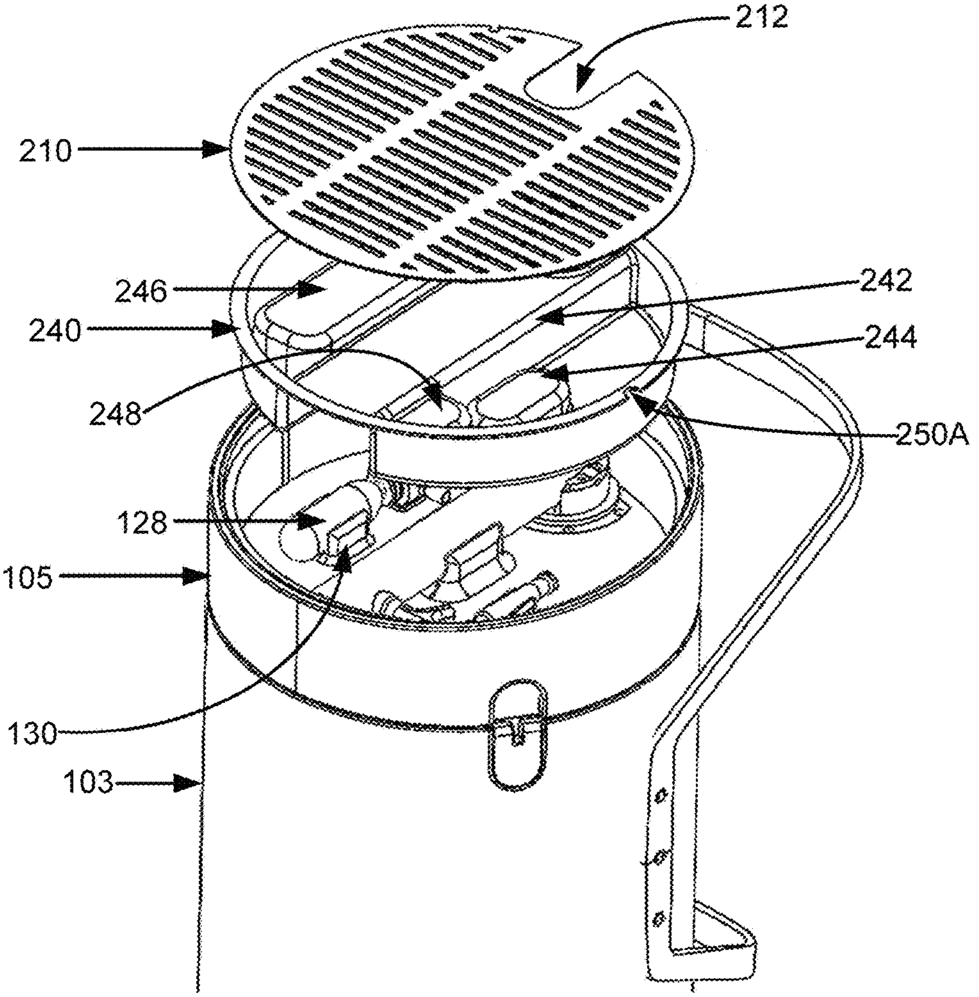
FIG. 2A is a perspective exploded view illustrating selected features of the upper portions of the transport/dispenser in combination with a drip tray grate and a drip tray reservoir.
Figure 2B:
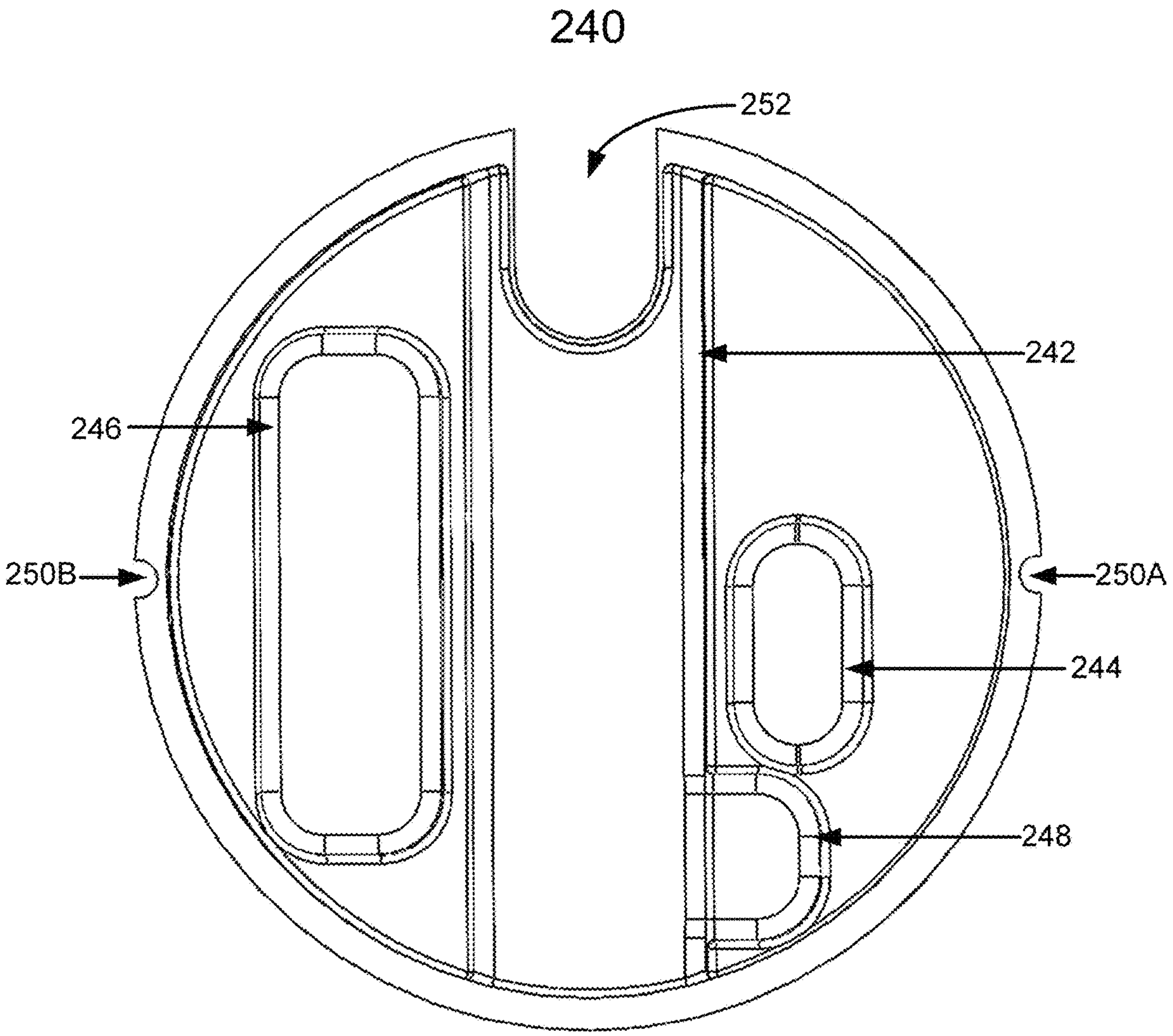
FIG. 2B is a top plan view illustrating selected features of the drip tray reservoir.

In the process of dispensing the beverage, some overflow is likely, particularly when the beverage is carbonated. In embodiments, therefore, a drip tray grate and a drip tray reservoir are used to catch and dispose of the beverage overflow. FIG. 2A illustrates an exploded combination 200 of the upper portions of the transport/dispenser 100 with a drip tray grate 210 and a drip tray reservoir 240 above the lid 105. FIG. 2B illustrates top plan view of the drip tray reservoir 240, which is sized and formed to fit on top of the floor 140 of the lid 105 and receive the various components on top of the lid floor 140 (e.g., the tower 118 with the faucet 120 and the tower receptacle 122; the faucet handle receptacle 126; the CO2 canister 128 with the CO2 retainer 130 and the regulator 134 with its mount 144) into spaces formed by walls 242, 244, 246, and 248. Portions of the drip tray reservoir 240 form an opening 252 that allows the tower 118 to protrude vertically when the drip tray reservoir 240 is in place during beverage dispensing operations. A matching opening 212 is defined by portions of the drip tray grate 210. As is illustrated in FIG. 2A, the drip tray grate 210 also has portions defining slots that allow the overflow of the beverage formed during dispensing to flow down and collect in the drip tray reservoir 240.

The drip tray reservoir 240 may also include portions defining cutouts 250A and 250B, for locating (orienting) the drip tray reservoir 240 in the lid 105; the lid 105 may include vertical protrusions 150A and 150B (see FIG. 1H) corresponding to the locating cutouts 250A and 250B. In some embodiments, magnets (magnetic catches) fixed to the lid 105 and to the drip tray reservoir 240 may perform the function of orienting the drip tray reservoir 240 in the lid 105.

Figure 3A:
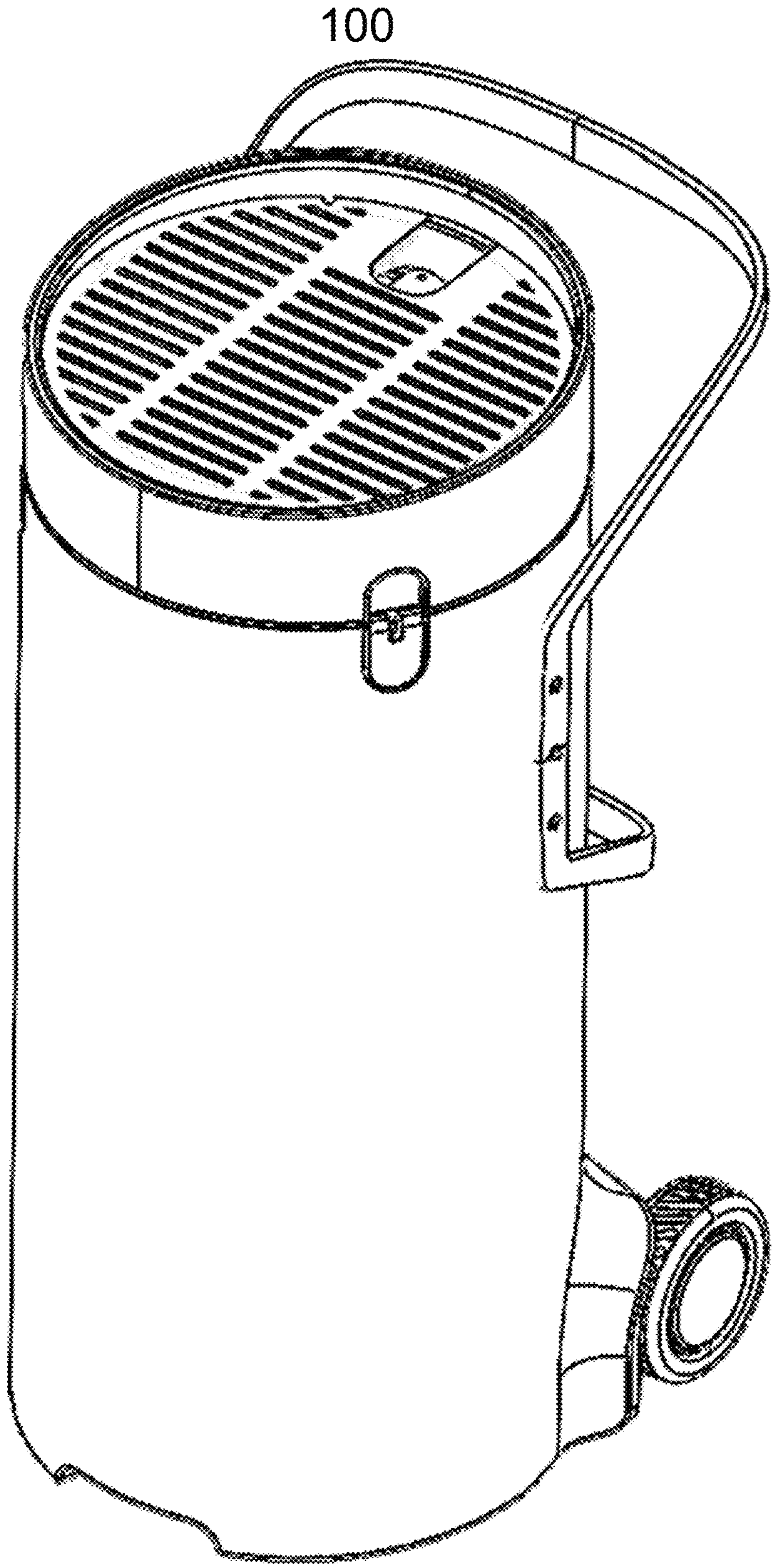
FIG. 3A is a perspective view illustrating selected features of the transport/dispenser including the drip tray grate and the drip tray reservoir installed in the multifunctional lid and the dispensing tower of the multifunctional lid in the lowered position.
Figure 3B:
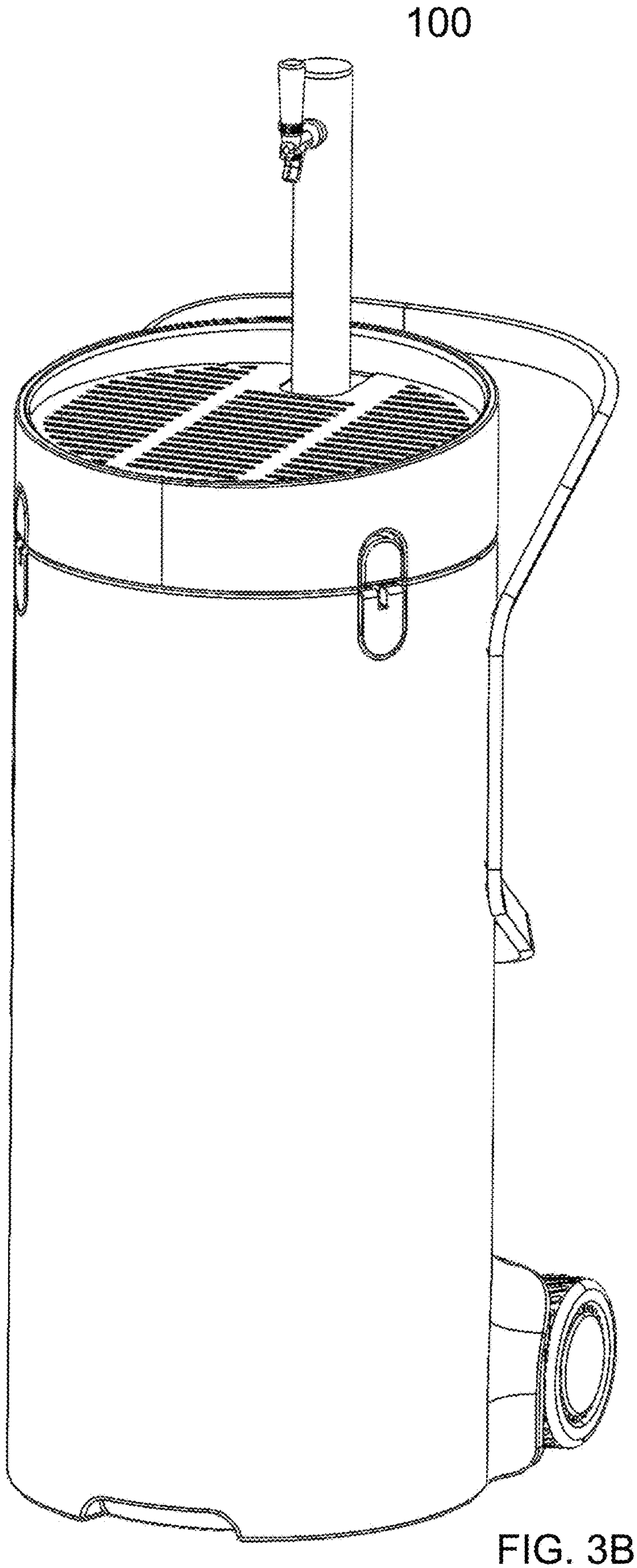
FIG. 3B is a perspective view illustrating selected features of the transport/dispenser including the drip tray grate and the drip tray reservoir installed in the multifunctional lid and the dispensing tower of the multifunctional lid in the raised position.

FIG. 3A illustrates the transport/dispenser 100 with the drip tray grate 210 and the drip tray reservoir 240 installed in the lid 105 and the dispensing tower 118 in the lowered position, as it would typically be during storage or transportation. FIG. 3B illustrates the transport/dispenser 100 with the drip tray grate 210 and the drip tray reservoir 240 installed in the lid 105 and the dispensing tower 118 in the erect position, as it would typically be during beverage dispensing operations.

Figure 4A:
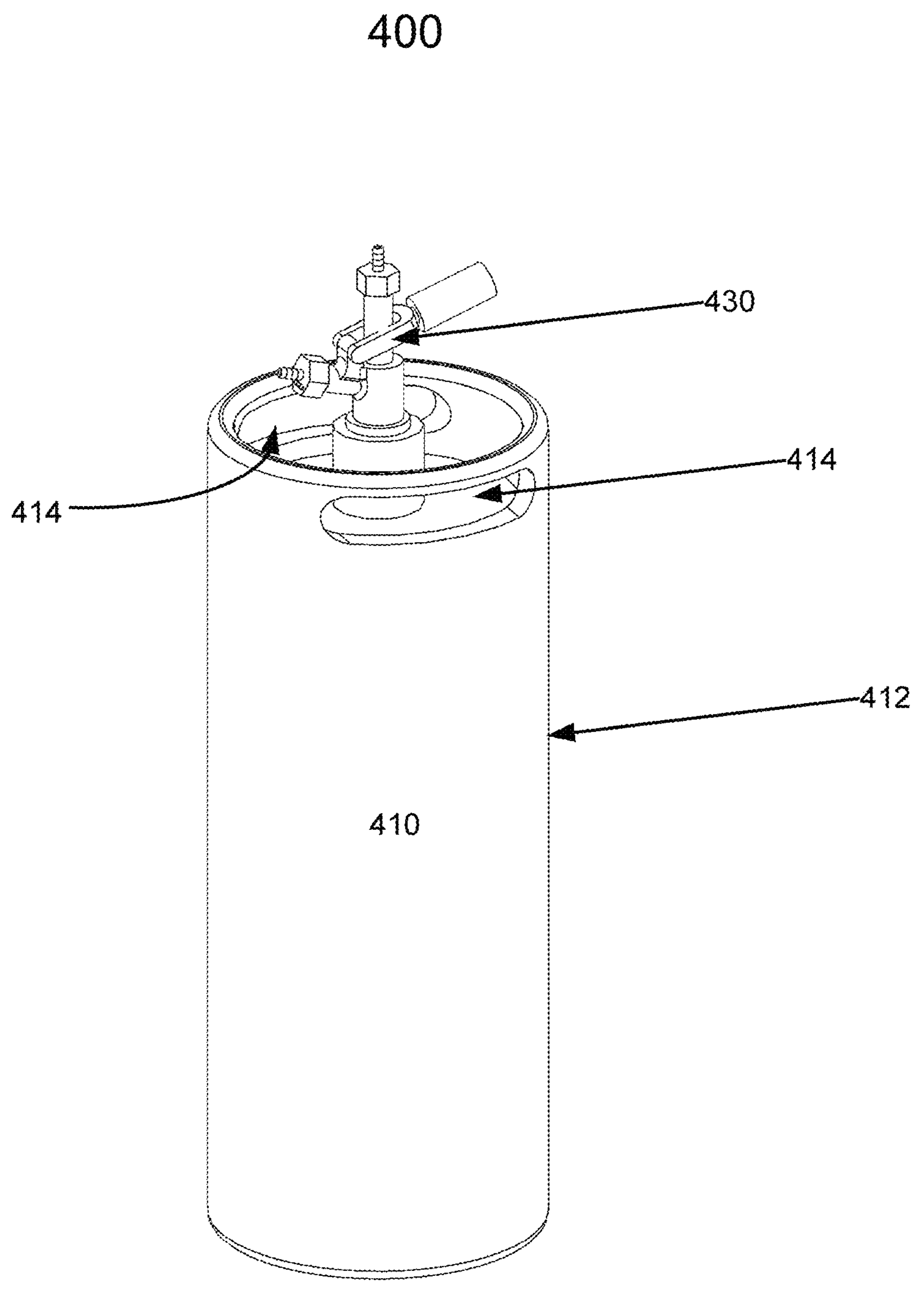
FIG. 4A and FIG. 4B are perspective views illustrating selected features of a keg with a keg coupler installed thereon.

As has already been said, the body 103 is configured to receive a beverage keg, such as a Cornelius keg, a Sixth Barrel keg, a Quarter Barrel Keg, Slim Quarter keg, Half Barrel keg, a 50-Litre keg, and other types of kegs. FIG. 4A is a perspective view of an example of a keg combination 400 of a keg 410 with a keg coupler 430; in operation, the keg combination 400 is inserted into the body 103 of the transport/dispenser 100, for providing the beverage to be dispensed. The keg 410 includes a keg body 412 with portions defining cutouts 414, which cutouts may be used for lifting and otherwise handling the keg 410. The keg coupler 430 is used to connect the keg 410 to receive CO2 and to provide a flow of the beverage from the keg 410 into the dispensing tower 118 and the faucet 120.

Figure 4B:
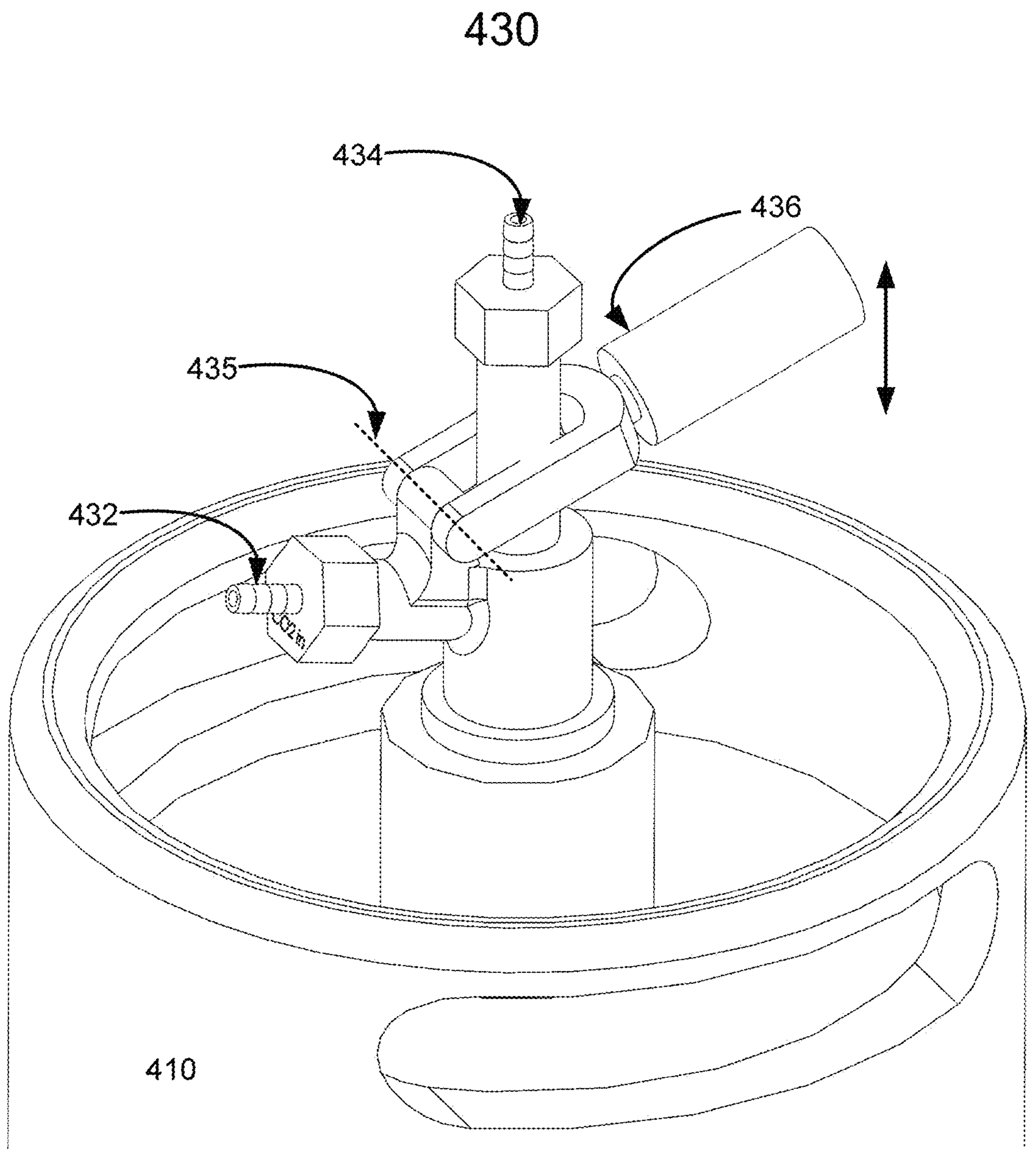

FIG. 4B is a perspective view of the keg coupler 430 installed on the keg 410. (Only a small top portion of the keg 410 is shown in this Figure.) The keg coupler 430 includes a CO2 nipple 432 for coupling to a hose providing pressurized CO2 to the keg 410. (More generally, it is a gas input port for receiving the pressurized gas and conducting or guiding it into the keg.) In examples, the coupling may include simply pushing the hose onto the protruding and undulating portion of the CO2 nipple 432. The keg coupler 430 also includes a beverage nipple 434 for coupling to another hose that leads towards the faucet of the dispensing device, such as the faucet 120 on the tower 118. (More generally, it is a beverage flow port for outflow of the beverage from the keg.) The keg coupler 430 further includes a handle 436, which can be pushed down to pivot around the dashed line 435 to engage the keg coupler 430 with the beverage storage of the keg 410, and pulled up to disengage the two. One example of a commercially available keg coupler is Kegco KC KT85D-L Keg Coupler D System, available from Amazon dot com at the time of filing of this document. (The Amazon description of the Kegco KC KT85D-L Keg Coupler D System is filed together or substantially together with this document and is hereby incorporated by reference.) Other keg coupler types with other types of coupling may also be used; for example, a keg coupler may be screwed onto to the keg 410 with appropriate hoses connected to the nipples 432 and 434 from below; and still other keg couplers are contemplated.

Figure 4C:
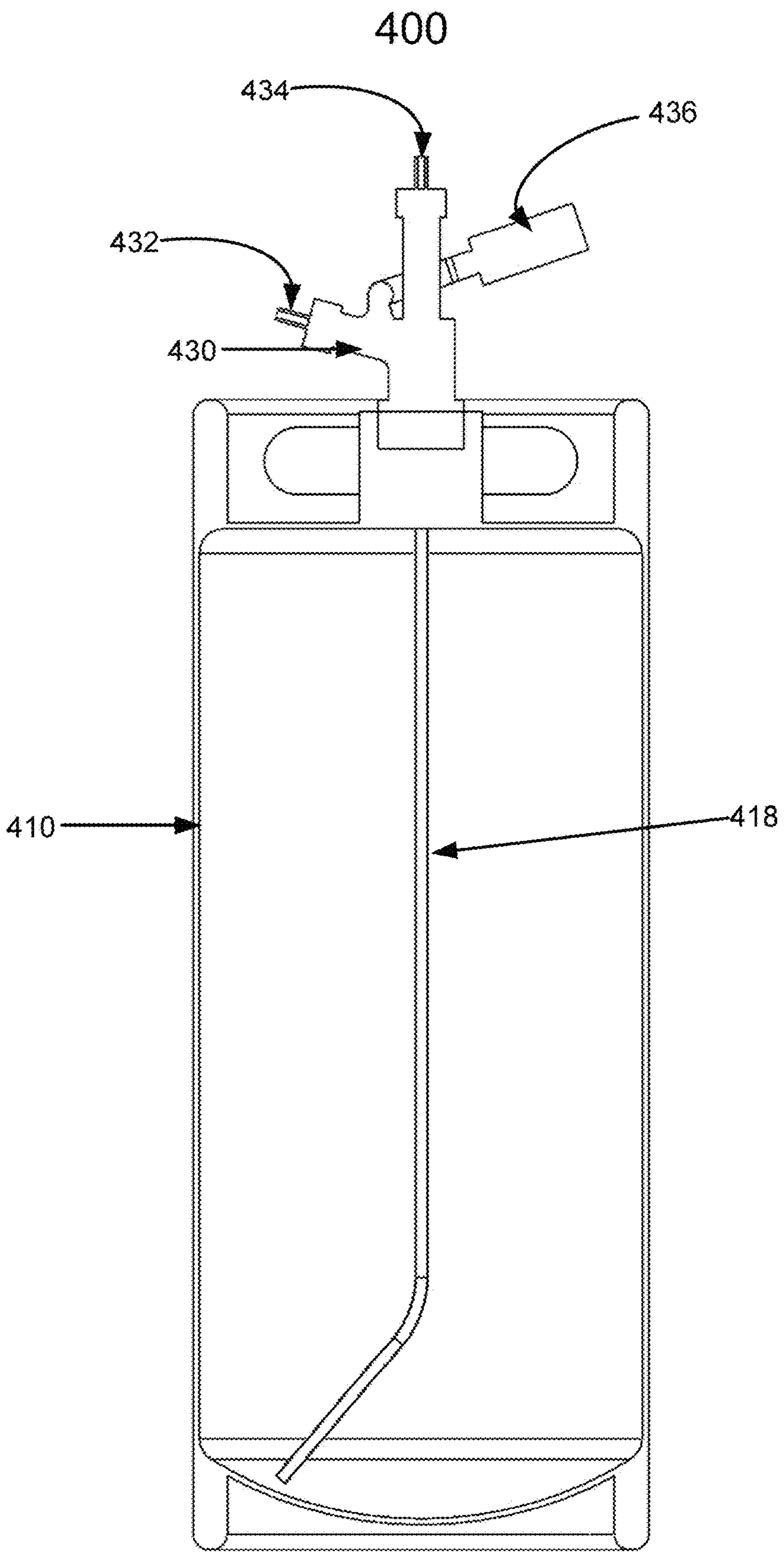
FIG. 4C is a schematic cross-sectional view illustrating selected features of the keg with the keg coupler installed thereon.

FIG. 4C is a schematic cross-sectional view of the keg combination 400. Note a conduit 418 (e.g., a pipe or hose/line) that extends from the top of the keg 410 towards its bottom. When the keg coupler 430 is engaged with the beverage storage of the keg 410 (the handle 436 pushed down), the nipple 434 connects hydraulically to the conduit 418, so that the beverage within the keg body 412 can flow from the bottom of the keg 410 into and through the beverage nipple 434. (The details of the connections of the nipple 434 and the conduit 418 are not shown in the Figures.) Similarly, when the keg coupler 430 is engaged with the beverage storage of the keg 410 (the handle 436 pushed down), the nipple 432 connects to the space within the keg body 412 so that the pressurized CO2 can push the beverage down and through the conduit 418.

Figure 5A:
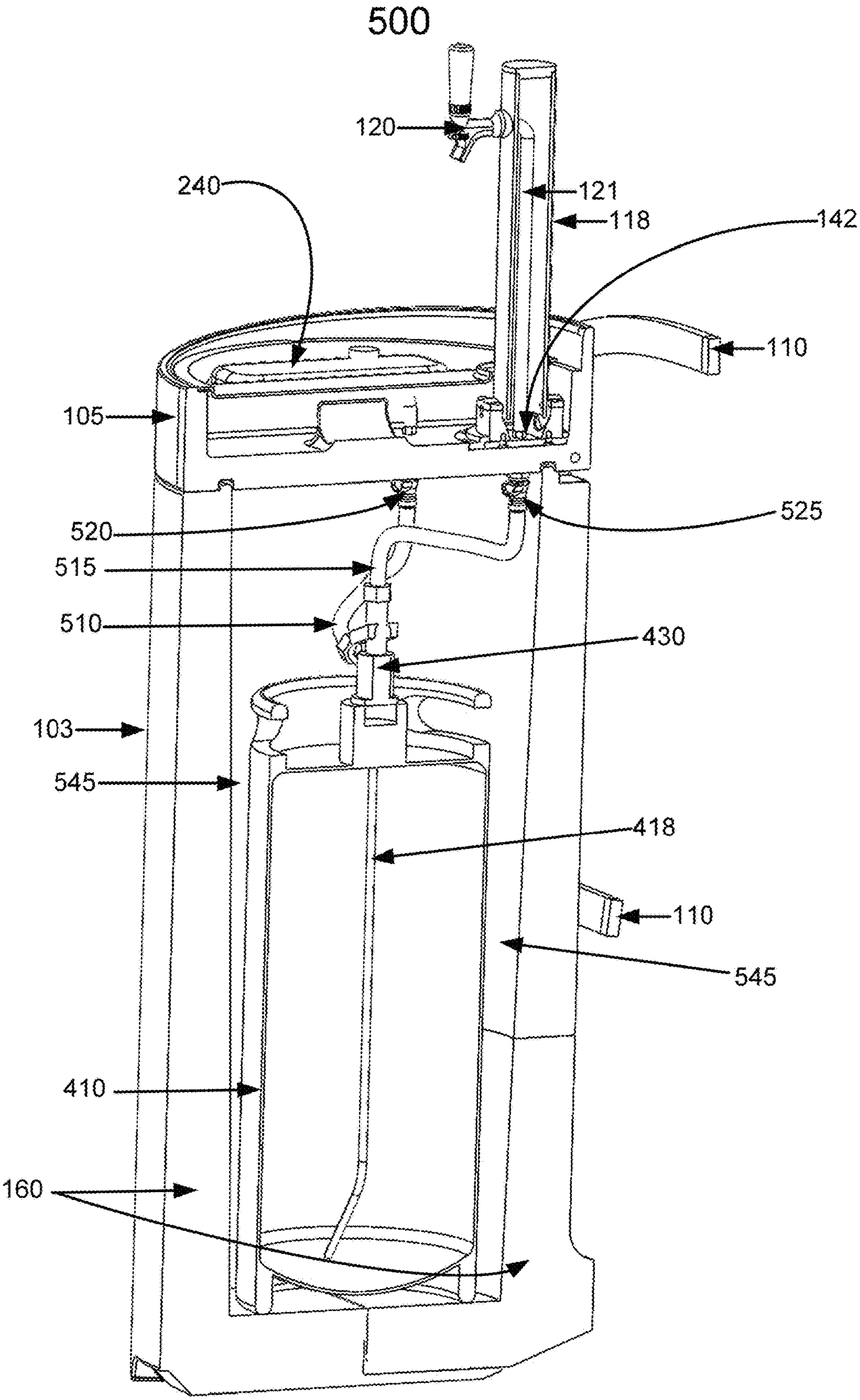
FIG. 5A is a perspective view illustrating selected features through a cutaway of the transport/dispenser with the drip tray grate, the drip tray reservoir, the keg, and the keg coupler installed and the $CO_2$ and beverage hoses/lines connected.

FIG. 5A is a perspective view of cutaway of the transport/dispenser 100 with the drip tray grate 210, the drip tray reservoir 240, and the keg combination 400 (the keg 410 and the keg coupler 430) installed and the CO2 and beverage conduits connected, so that the transport/dispenser 100 may be ready for dispensing. Reference numeral 500 designates the combination of these components. The section line is the A-A' line shown in FIG. 1H. Most of the component parts in FIG. 5A (identically designated as in the other Figures) have already been discussed. While FIG. 1H shows the tower 118 in the down position, however, the tower 118 is shown raised in FIG. 5A. Note also that some internal details of the keg coupler 430 are omitted in FIG. 5A and other Figures. As has already been mentioned, the walls of the main body 103 may include the thermal insulation 160. Note space 545 between the keg 410 and the thermal insulation 160; in operation, the space 545 may be filled with the cooling medium (loose ice, ice packs, other types of cold packs).

A lower gas conduit 510 provides a connection for the keg combination 400 to receive the CO2 from the canister 128. One end of the lower gas conduit 510 is thus coupled to (e.g., pulled over) the nipple 432 of the keg coupler 430. The other end of the lower gas conduit 510 extends towards the lid 105 and couples to the upper gas conduit 136 through a gas or gas/liquid tube coupler or fitting 520. A lower beverage conduit 515 provides a connection from the beverage nipple 434 to the upper beverage conduit 121 inside the tower 118, and through it to the faucet 120. One end of the lower beverage conduit 515 is thus coupled to (e.g., pulled over) the nipple 434 of the keg coupler 430. The other end of the lower beverage conduit 515 extends towards the lid 105 and couples to the upper beverage conduit 121 through a liquid or liquid/gas tube coupler or fitting 525.

Advantageously, the couplers 520 and 525 may be the same type of part. (Note that "may" is used permissively throughout this document; thus, the couplers 520/525 may be the same, or they may differ.) Also advantageously, these couplers may be quick-disconnect (or quick-release) couplers. A coupler may include a plug and a socket that join with a latch, so that they can easily and frequently connect and disconnected a gas and/or liquid line. To connect, the plug is inserted into the socket; to disconnect, the latch on the socket may be finger-pressed and the plug pulled out and removed. The coupler may be made of FDA-approved materials, including moisture-resistant plastics that do not absorb (or resist absorbing) liquid and lose strength, even in high-humidity food and beverage applications. McMASTER-CARR 5012K119 is one such coupler. (The catalog description of the McMASTER-CARR 5012K119 is filed together with this document and hereby incorporated by reference.)

Figure 5B:
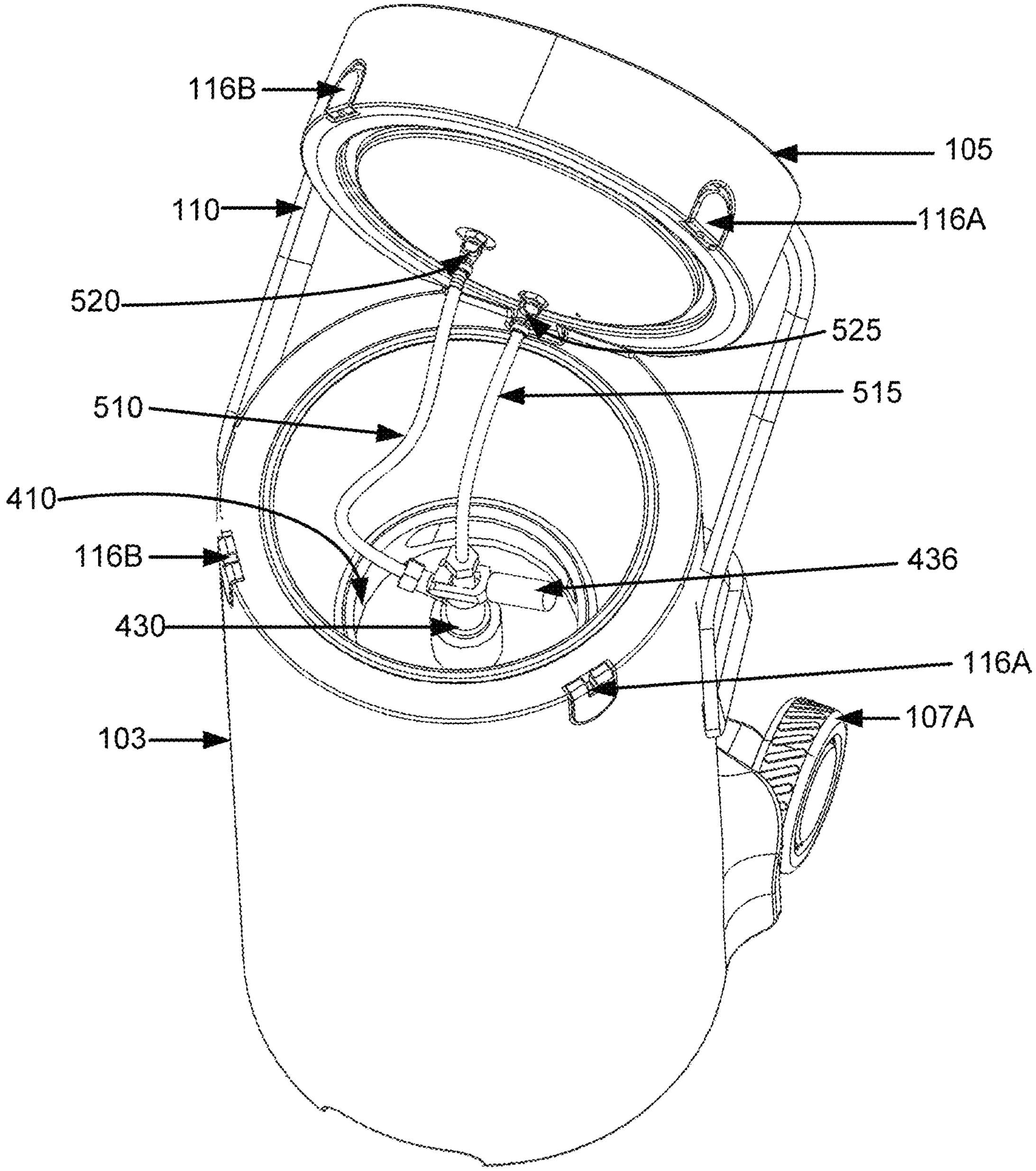
FIG. 5B is a perspective view illustrating selected features of the transport/dispenser with the multifunctional lid in the open position.

The lower gas conduit 510 and the lower beverage conduit 515 should have flexibility and length to allow lifting the lid 105 (e.g., lifting the portions 114 and rotating the lid 105 around the rod near the portions 112) sufficiently to disconnect the conduit 510 from (or connect the conduit 510 to) the upper gas conduit 136, and, analogously, to disconnect the lower beverage conduit 515 from (or connect the conduit 515 to) the upper beverage conduit 121. FIG. 5B is a perspective view of the transport/dispenser 100 with the lid 105 in open position with the conduits 510 and 515 extended.

Figure 6A:
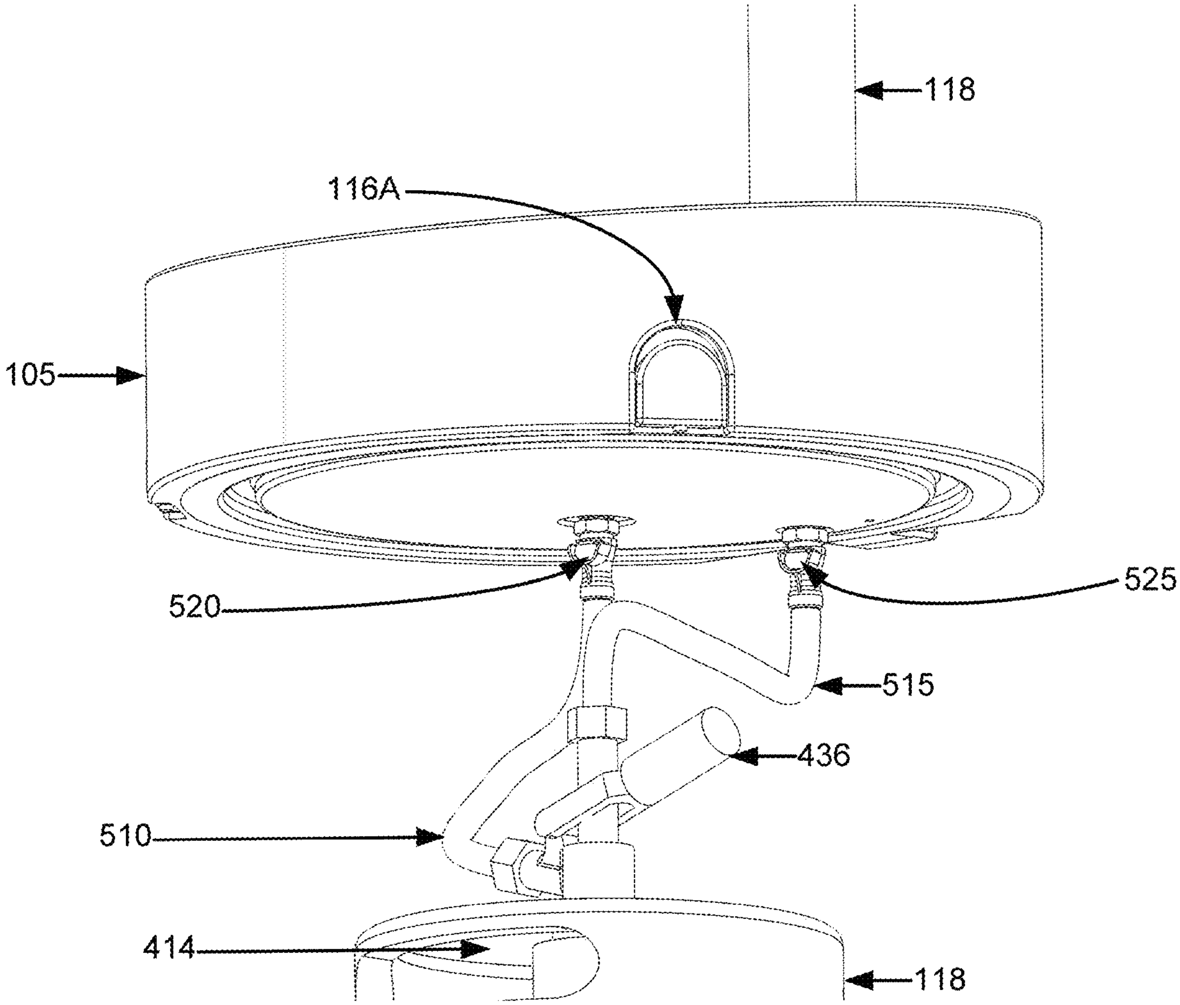
FIG. 6A and FIG. 6B are perspective views illustrating selected features of the multifunctional lid coupled to the keg and keg coupler with gas and beverage conduits.
Figure 6B:
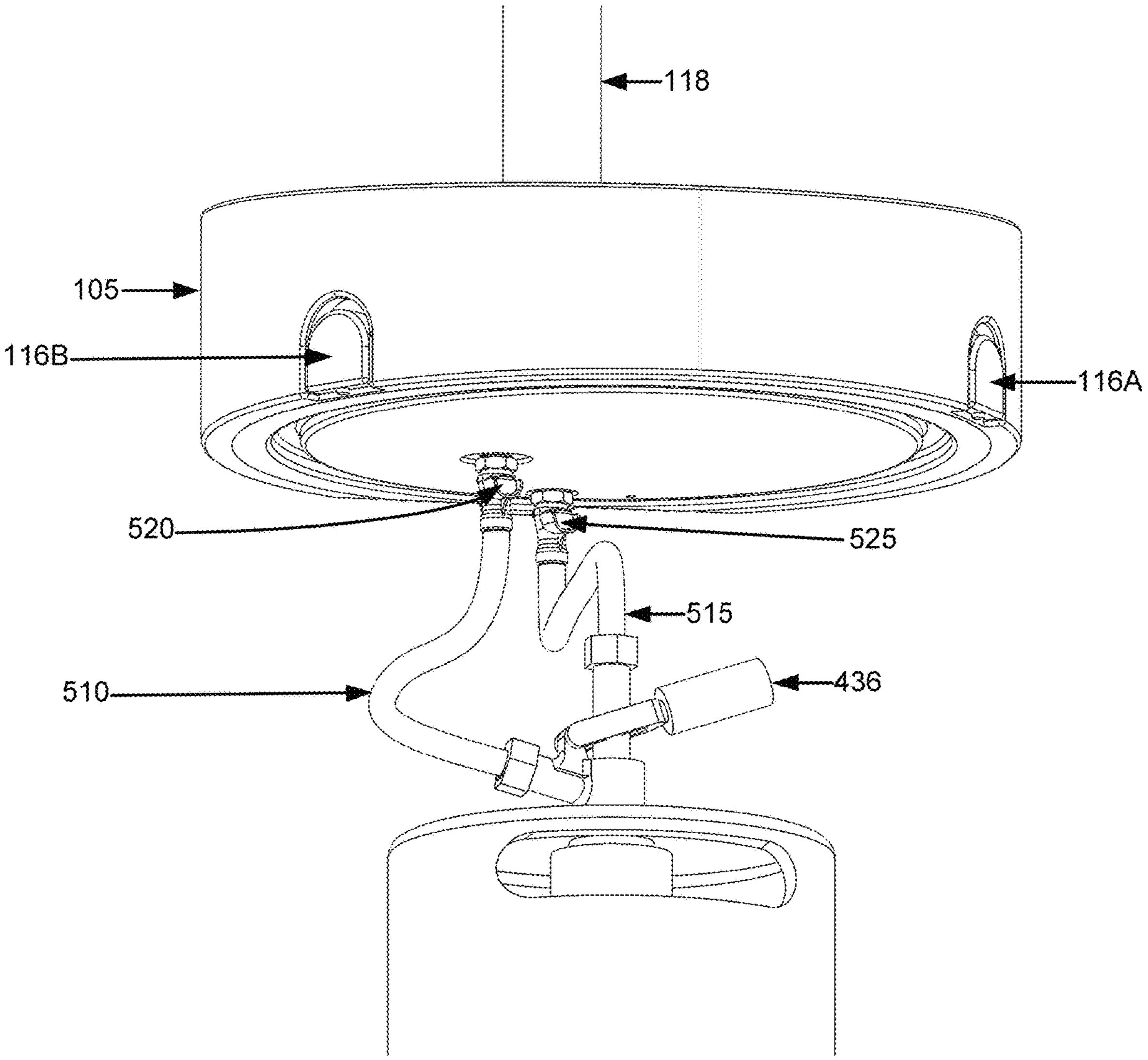

FIG. 6A and FIG. 6B show the lid 105 coupled to the keg combination 400 (the keg 410 and the keg coupler 430) through the lower gas conduit 510 and the lower beverage conduit 515.

In embodiments, the lid is attached to the main body without the rod, e.g., only with latches (two, three, or more lathes such as the latches 116A/116B). In such embodiments, the flexibility and lengths of the lower gas conduit 510 and the lower beverage conduit 515 should be sufficient to lift the lid and allow access to connect/disconnect the conduits 510/515 to the upper gas conduit 136 and the upper beverage conduit 121, respectively.

In embodiments, one or more hinges replace the rod.

Figure 7A:
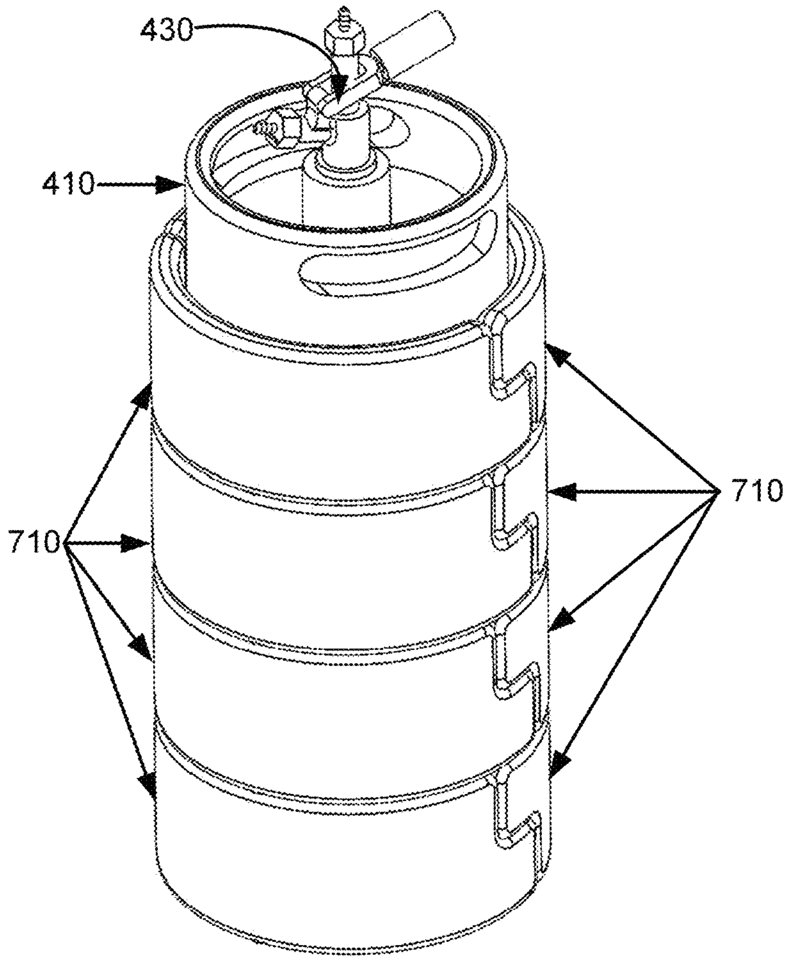
FIG. 7A is a perspective view illustrating selected features of cold packs wrapped around the beverage keg.
Figure 7B:
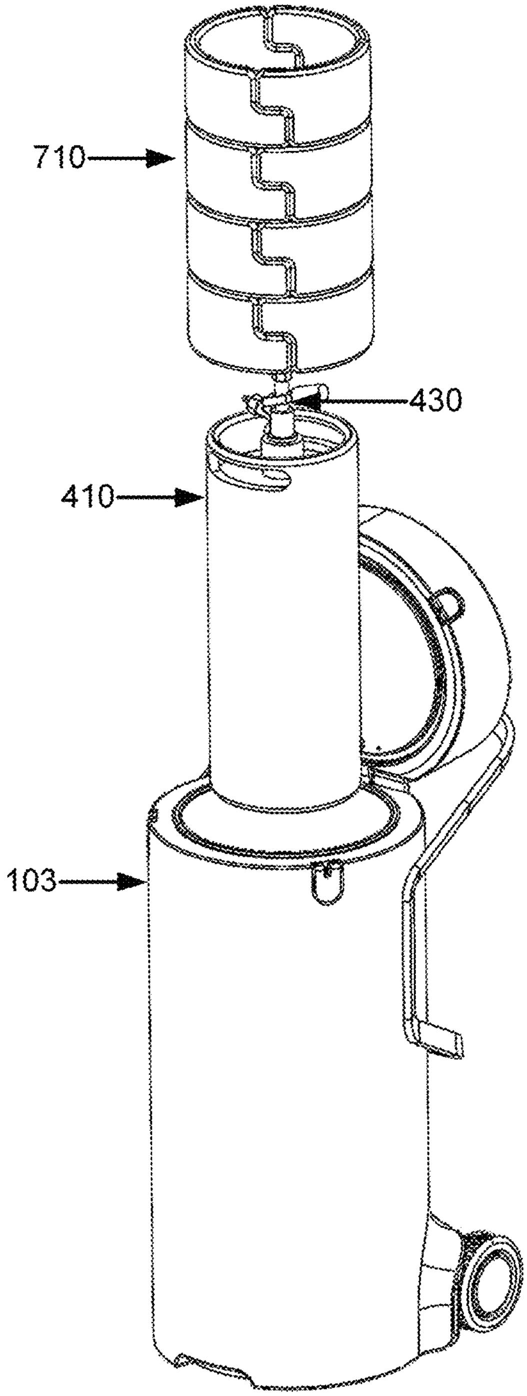
FIG. 7B is a perspective view illustrating selected features of insertion of the beverage keg and the cold packs into the transport/dispenser.

FIG. 7A and FIG. 7B illustrate the use of cold packs, i.e., ice packs or other types of cold packs. In FIG. 7A, a plurality of cold packs 710 is wrapped around the keg 410. FIG. 7B illustrates insertion of the keg 430 and cold packs 710 into the main body 103.

In a typical operation, a keg coupler (such as the keg coupler 430) is coupled to a keg (such as the keg 410) containing a beverage, e.g., by placing the keg coupler on the keg and pushing down on the handle (such as the handle 436) of the keg coupler. A lower gas conduit (such as the lower gas conduit 510) is coupled to the gas receiving port (e.g., the CO2 nipple 432) of the keg coupler, and a lower beverage conduit (such as the lower beverage conduit 515) is coupled to the beverage output port (such as the beverage nipple 434). A multifunctional lid (such as the lid 105) of a transport/dispenser (such as the transport/dispenser 100) is opened and the keg together and the keg coupler are placed inside the main body of the transport/dispenser. The lower gas conduit is coupled to the upper gas conduit (such as the upper gas conduit 136) of the lid using a gas coupler (such as the quick-disconnect coupler 520). Similarly, the lower beverage conduit is coupled to the upper beverage conduit (such as the upper beverage conduit 515) of the lid using a beverage coupler (such as the quick-disconnect coupler 525). The two quick-disconnect couplers may be gas/liquid quick-disconnect couplers. The lid is then lowered and latched to the main body of the transport/dispenser. A CO2 canister is attached to the lid and coupled to the pressure regulator of the lid. A drip tray grate (such as the drip tray grate 210) and a drip tray reservoir (such as the drip tray reservoir 240) are placed on the lid. The transport/dispenser is transported to the venue, if needed. The drip tray grate and the drip tray reservoir are removed, and the tower is raised. The drip tray grate and the drip tray reservoir are then replaced. The regulator is set to a selected pressure value, and a gas valve of the CO2 canister is opened to allow the CO2 to flow into the keg, creating pressure and forcing the beverage flow up to the faucet and allowing the beverage to be dispensed selectively through the faucet by turning the faucet on and off. After the keg is emptied, the CO2 canister valve is closed, the drip tray grate and the drip tray reservoir are removed, the tower is lowered, the lid is unlatched and lifted, and the quick-disconnect couplers are disconnected. The steps can then be repeated with a fresh keg.

Figure 8:
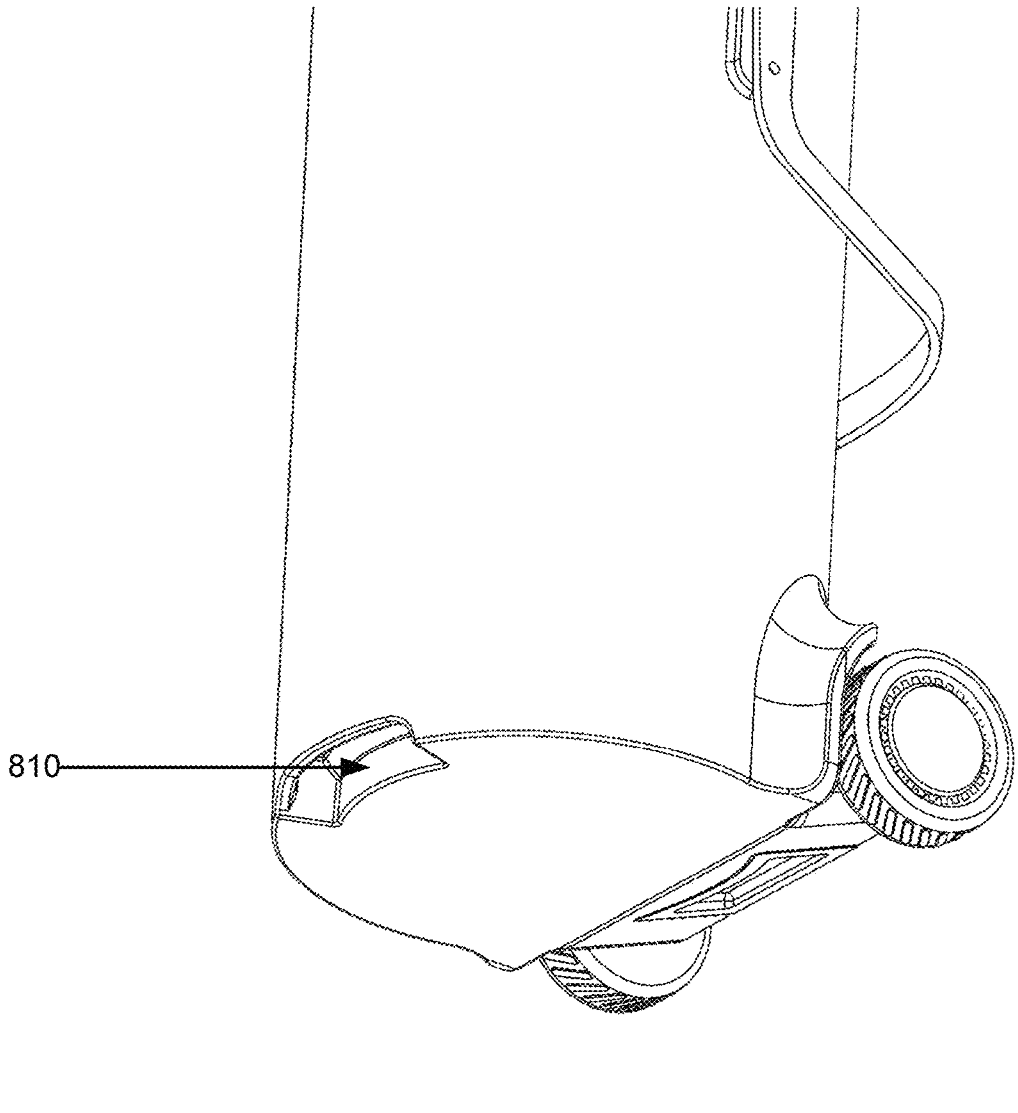
FIG. 8 is a perspective view illustrating selected features of a bottom grab handle of the transport/dispenser.

FIG. 8 is a perspective view of the bottom of the transport/dispenser 100. Note in particular a grab handle 810 formed (e.g., attached, machined) on the front to facilitate lifting and otherwise handling of the transport/dispenser 100.

Figure 9A:
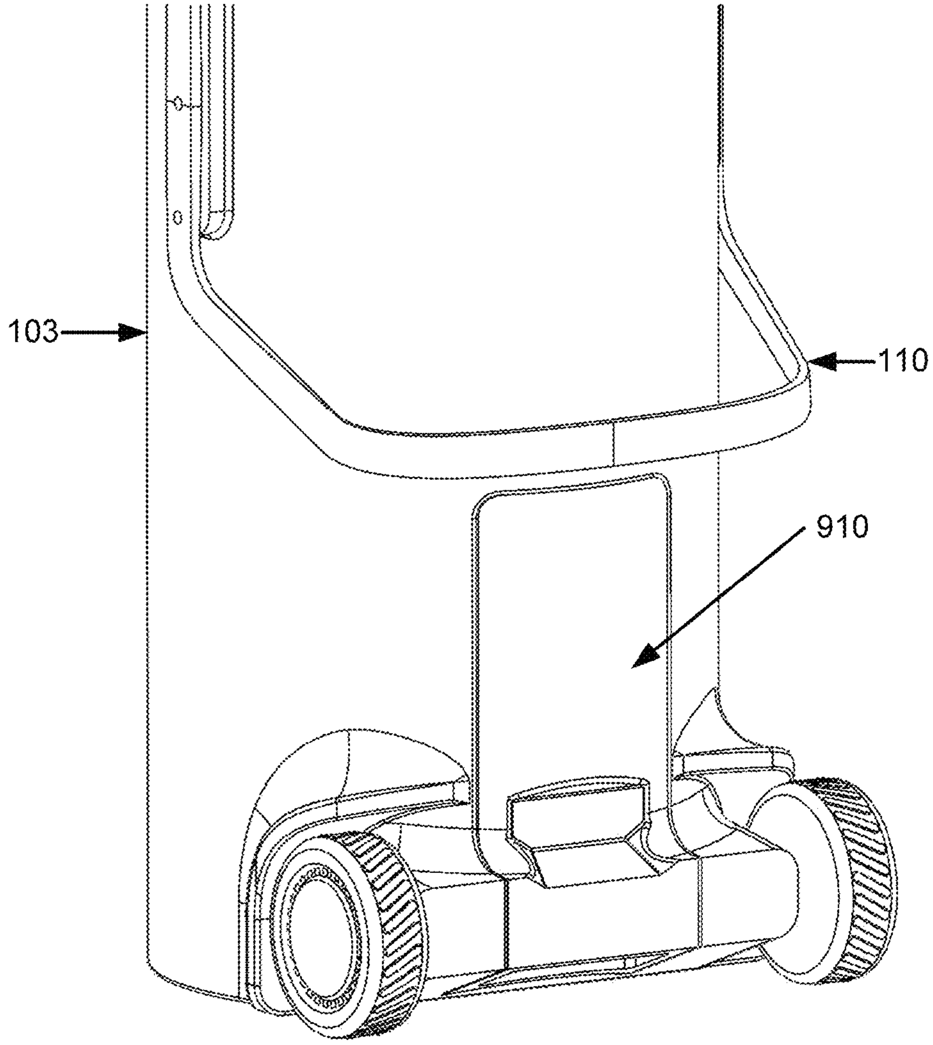
FIG. 9A and FIG. 9B are perspective views illustrating selected features of the transport/dispenser with a drain spigot on the bottom.
Figure 9B:
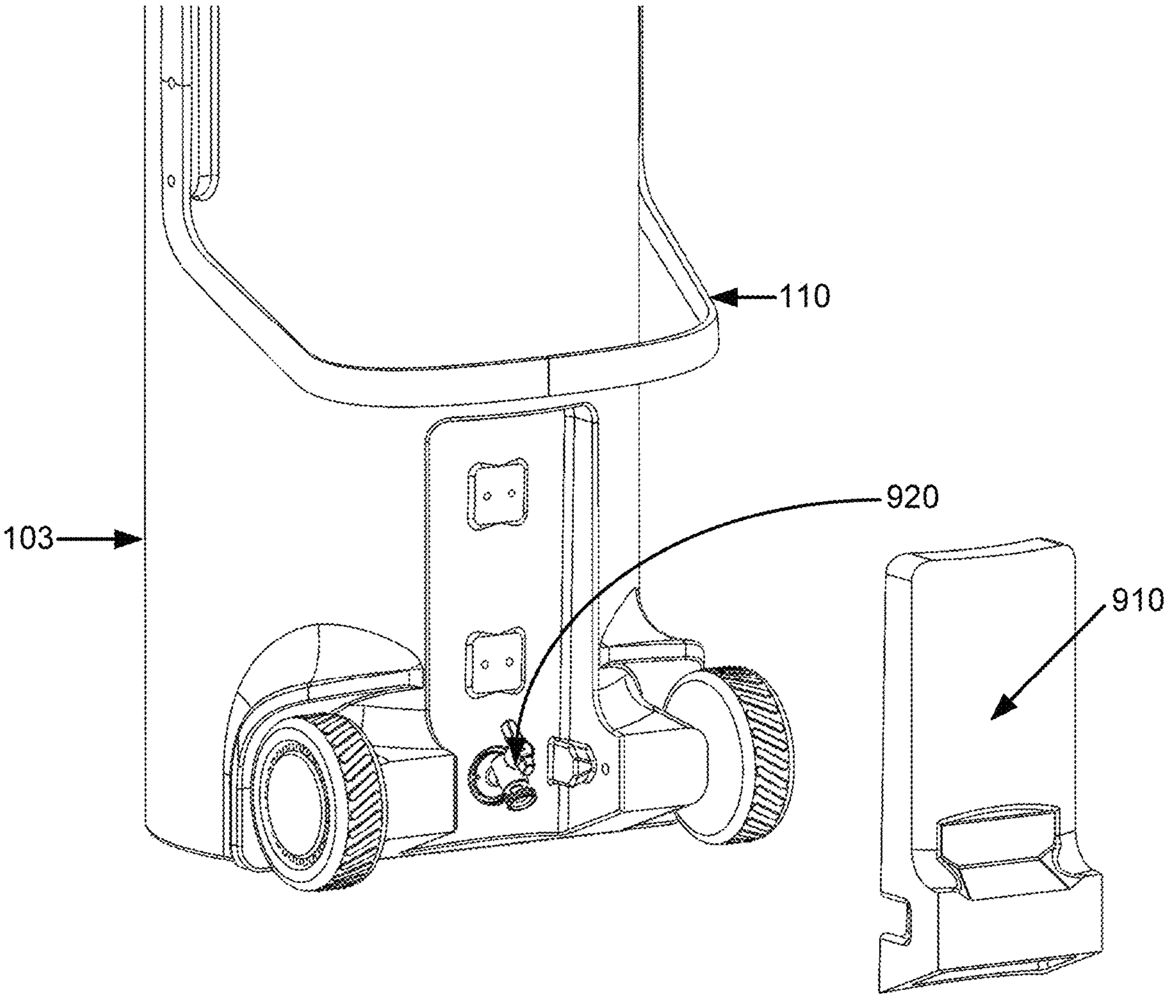

A liquid may accumulate on the bottom of the main body 100, for example, melted ice, spilled beverage, and condensation. To facilitate disposal of such liquid, the main body 100 may include a drain with a spigot. FIG. 9A and FIG. 9B are perspective views of such main body 100 with a detachable panel 910 that covers a spigot 920.

Although the method steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. For example, the keg coupler may be coupled to the keg after the keg is placed inside the main body of the transport/dispenser. Furthermore, not every illustrated step and decision block may be required in every embodiment in accordance with the concepts described in this document, while some steps and decision blocks that have not been specifically illustrated may be desirable or necessary for proper operation in some embodiments in accordance with the concepts. It should be noted, however, that specific embodiments/variants/implementations/examples use the particular order(s) in which the steps and decision blocks (if applicable) are shown and/or described.

The features described throughout this document and all the incorporated documents may be present individually, or in any combination or permutation, except where the presence or absence of specific features (elements/steps/limitations) is inherently required, explicitly indicated, or otherwise made clear from the description. This applies whether or not features appear related to specific embodiments; thus, features of the different described embodiments may be combined.

This document describes in detail the inventive apparatus and methods for storing, transporting, and dispensing beverages. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features may be employed in the absence of use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A combination of: a beverage transport/dispenser, comprising: a main body comprising a round wall including an outer shell and thermal insulation, the round wall defining an opening on top and an inner compartment sized for one or more beverage keg types; a multifunctional lid formed to cover the opening, the multifunctional lid comprising an outer surface and an inner surface and portions defining a first opening and a second opening, the first and the second openings allowing tubes to extend through the multifunctional lid from the outer surface to the inner surface and into the inner compartment when the multifunctional lid is mounted on the main body, the multifunctional lid and the main body comprising a mechanism to attach the multifunctional lid to the main body at the opening on top of the main body, thereby covering the inner compartment and allowing opening and closing the multifunctional lid on the main body; a quick-disconnect beverage tube fitting comprising a first beverage tube fitting component and a second beverage tube fitting component; and a quick-disconnect gas tube fitting comprising a first gas tube fitting component and a second gas tube fitting component; wherein: the multifunctional lid comprises a dispensing tower and a tower mount, the tower mount attaching the dispensing tower to the outer surface above the first opening and allowing the dispensing tower to be lowered to lie flat on the multifunctional lid in a first position and to be raised to stand erect on the multifunctional lid in a second position; the dispensing tower comprises an upper end and a lower end, the lower end being nearer to the tower mount than the upper end, a faucet at the upper end, and an upper beverage conduit comprising a first end coupled to the faucet and a second end extending through the first opening and attached to the first beverage tube fitting component; and the multifunctional lid further comprises a gas canister retainer to hold a canister of compressed carbon dioxide ($CO_2$) on the outer surface, a pressure regulator with a gas input and a gas output, the canister being coupled to the gas input of the pressure regulator, a regulator mount supporting the pressure regulator on the outer surface of the multifunctional lid, and an upper gas conduit comprising a first end coupled to the gas output and a second end extending through the second opening and attached to the first gas tube fitting component;

a keg containing a beverage;

a keg coupler comprising a beverage flow port and a gas input port, the keg coupler being coupled to the keg;

a lower beverage conduit comprising a first end coupled to the beverage flow port and a second end attached to the second beverage tube fitting component; and a lower gas conduit comprising a first end coupled to the gas input port and a second end attached to the second gas tube fitting component;

wherein the keg, the keg coupler, the lower beverage conduit, and the lower gas conduit are placed in the inner compartment, the first beverage tube fitting component and the second beverage tube fitting component are coupled together, and the first gas tube fitting component and the second gas tube fitting component are coupled together, so that when the $CO_2$ is allowed to flow from the canister, the beverage may be poured by opening the faucet and wherein the main body is rotomolded.

2. The combination of claim 1, wherein: the first beverage tube fitting component comprises a first plug and the second beverage tube fitting component comprises a first socket; and the first gas tube fitting component comprises a second plug and the second gas tube fitting component comprises a second socket.

3. The combination of claim 1, wherein: the first beverage tube fitting component comprises a first socket and the second beverage tube fitting component comprises a first plug; and the first gas tube fitting component comprises a second socket and the second gas tube fitting component comprises a second plug.

4. The combination of claim 1, wherein: the first beverage tube fitting component and the second beverage tube fitting component are selected from the group consisting of a first plug and a first socket; and the first gas tube fitting component and the second gas tube fitting component are selected from the group consisting of a second plug and a second socket.

5. The combination of claim 4, wherein the multifunctional lid further comprises a tower receptacle attached to the outer surface in a location to receive the tower in the first position.

6. The combination of claim 5, further comprising a drip tray reservoir on top of the outer surface and a drip tray grate on top of the drip tray reservoir, so that beverage overflow passes through the drip tray grate and is collected in the drip tray reservoir.

7. The combination of claim 6, wherein the drip tray reservoir comprises locating cutouts and the multifunctional lid further comprises vertical protrusions corresponding to the locating cutouts to orient the drip tray reservoir in the multifunctional lid.

8. The combination of claim 6, wherein the drip tray reservoir and the multifunctional lid comprise magnetic catches to orient the drip tray reservoir in the multifunctional lid.

9. The combination of claim 6, wherein the drip tray reservoir and the multifunctional lid comprise means for orienting the drip tray reservoir in the multifunctional lid.

10. The combination of claim 1, wherein the beverage transport/dispenser further comprises a grip handle attached to the main body and a pair of wheels attached to the body.

11. The combination of claim 1, wherein the mechanism to attach the multifunctional lid to the main body comprises a rod in the main body allowing the multifunctional lid to pivot and a latch allowing fastening of the multifunctional lid to the main body.

12. The combination of claim 1, wherein the mechanism to attach the multifunctional lid to the main body comprises a rod in the main body allowing the multifunctional lid to pivot and at least two latches allowing fastening of the multifunctional lid to the main body.

13. The combination of claim 1, wherein the mechanism to attach the multifunctional lid to the main body comprises at least two latches allowing fastening of the multifunctional lid to the main body.

14. The combination of claim 1, wherein the mechanism to attach the multifunctional lid to the main body comprises means for attaching the multifunctional lid to the main body.

15. The combination of claim 1, wherein the multifunctional lid further comprises a faucet handle receptacle attached to the outer surface of the multifunctional lid.

16. The combination of claim 1, wherein the pressure regulator is adjustable.

17. The combination of claim 1, wherein the pressure regulator is set to between 6 and 25 psi.

18. The combination of claim 1, wherein the pressure regulator is set to between 12 and 17 psi.

* * * * *